US011937283B2

(12) United States Patent
Khoshnevisan et al.

(10) Patent No.: US 11,937,283 B2
(45) Date of Patent: *Mar. 19, 2024

(54) QCL ASSUMPTION FOR A-CSI-RS CONFIGURED WITH MULTI-TRP

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,938

(22) Filed: May 24, 2023

(65) Prior Publication Data
US 2023/0379951 A1   Nov. 23, 2023

Related U.S. Application Data

(63) Continuation of application No. 17/152,571, filed on Jan. 19, 2021, now Pat. No. 11,665,722.
(Continued)

(51) Int. Cl.
*H04W 4/00*   (2018.01)
*H04B 7/06*   (2006.01)
(Continued)

(52) U.S. Cl.
CPC .......... *H04W 72/53* (2023.01); *H04B 7/0626* (2013.01); *H04W 8/24* (2013.01);
(Continued)

(58) Field of Classification Search
None
See application file for complete search history.

(56) References Cited

U.S. PATENT DOCUMENTS 11,665,722 B2   5/2023   Khoshnevisan et al.
2018/0279297 A1*   9/2018   Nogami ................ H04L 1/1887
(Continued)

FOREIGN PATENT DOCUMENTS

WO   2019099569 A1   5/2019

OTHER PUBLICATIONS

Ericsson: "Feature Lead Summary for Beam Management—Thursday", 3GPP TSG-RAN WG1 Meeting #94, R1-1809864, 3rd Generation Partnership Project, Mobile Competence Centre, 650, Route Des Lucioles, F-06921 Sophia-Antipolis Cedex, vol. RAN WG1, No. Gothenburg, Aug. 20, 2018-Aug. 24, 2018, Aug. 23, 2018 (Aug. 23, 2018), XP051517219, 26 Pages, Section 2.6, section 3.2, section 3.4, section 3.4.1, section 3.7, Chapters 3.4,3.4.1 and 3.12.
(Continued)

*Primary Examiner* — Zewdu A Beyen
(74) *Attorney, Agent, or Firm* — Patterson & Sheridan, L.L.P.

(57) ABSTRACT

Certain aspects of the present disclosure provide techniques for quasi-colocation (QCL) assumption for an aperiodic channel state information (A-CSI) reference signal (RS) configured with multiple transmission reception point (mTRP). A user equipment (UE) may receive signaling configuring the UE with a plurality of index values associated with different control resource sets (CORESETS). The UE may receive, from a base station (BS), first downlink control information (DCI) triggering an A-CSI-RS resource set for A-CSI reporting. The first DCI is received in a first CORESET of the different CORESETs associated with a first index value of the plurality of index values. The UE may determine a first time offset between the first DCI and the A-CSI-RS resource set. When the first time offset is smaller than a threshold time offset, the UE may determine
(Continued)

a QCL assumption for receiving the A-CSI-RS based, at least in part, on the first index value.

52 Claims, 21 Drawing Sheets

Related U.S. Application Data

(60) Provisional application No. 62/976,309, filed on Feb. 13, 2020.

(51) Int. Cl.
*H04W 8/24* (2009.01)
*H04W 72/0446* (2023.01)
*H04W 72/0453* (2023.01)
*H04W 72/23* (2023.01)
*H04W 72/53* (2023.01)
*H04W 76/27* (2018.01)
*H04W 80/02* (2009.01)

(52) U.S. Cl.
CPC ... *H04W 72/0446* (2013.01); *H04W 72/0453* (2013.01); *H04W 72/23* (2023.01); *H04W 76/27* (2018.02); *H04W 80/02* (2013.01)

(56) References Cited

U.S. PATENT DOCUMENTS

| | | |
|---|---|---|
| 2019/0229792 A1 | 7/2019 | John Wilson et al. |
| 2019/0273637 A1* | 9/2019 | Zhang .................. H04W 80/02 |
| 2020/0351682 A1 | 11/2020 | Cirik et al. |
| 2021/0243659 A1 | 8/2021 | Cirik et al. |
| 2022/0210812 A1 | 6/2022 | Matsumura et al. |
| 2023/0007667 A1 | 1/2023 | Matsumura et al. |

OTHER PUBLICATIONS

International Search Report and Written Opinion—PCT/US2021/014222—ISA/EPO—dated Apr. 15, 2021.
Nokia, et al., "FL Summary 2 on A-CSI-RS Triggering with Different Numerology Between CSI-RS and Triggering Pdcch", 3GPP TSG RAN WG1 Meeting #99, R1-1913390, Reno, NV, USA, Nov. 18, 2019-Nov. 22, 2019, Nov. 2019, 8 pages.
Qualcomm Incorporated: "Beam Management for NR", 3GPP TSG-RAN WG1 Meeting #94, 3GPP Draft,R1-1809711 Beam Management For NR, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 17, 2018 (Aug. 17, 2018), 16 Pages, XP051517061, Sections 6, 9, 11 and 12, p. 4, "Text Proposal 38.214 Subclause 5.1.5:", Section 5, 7 and 20, pp. 1, 14.
ZTE: "Considerations on Beam Management for Multi-TRP," 3GPP Draft, 3GPP TSG RAN WG1 #97, R1-1906244, Considerations on beam management for multi-TRP, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051727697, pp. 1-7, sections 2.1, 2.1.2, 2.2.2.

* cited by examiner

| 16-2k | Two simultaneous beams for m-DCI | Indicates whether UE supports receiving time-overlapping PDSCHs/PDCCHs with different beams | 16-2i | Yes | N/A | - | Per band | TDD only | FR2 only | - | Note: Applicable to FR2 only | Optional with capability signalling |
|---|---|---|---|---|---|---|---|---|---|---|---|---|

| 16-2n | Two default beams for m-DCI | Two default beams for multi-DCI based multi-PDSCH (lowest CORESET-ID per CORESETPoolIndex) | 16-2i, 16-2k | Yes | N/A | - | Per band | TDD only | FR2 only | - | Note: Applicable to FR2 only | Optional with capability signalling |
|---|---|---|---|---|---|---|---|---|---|---|---|---|

FIG. 5C

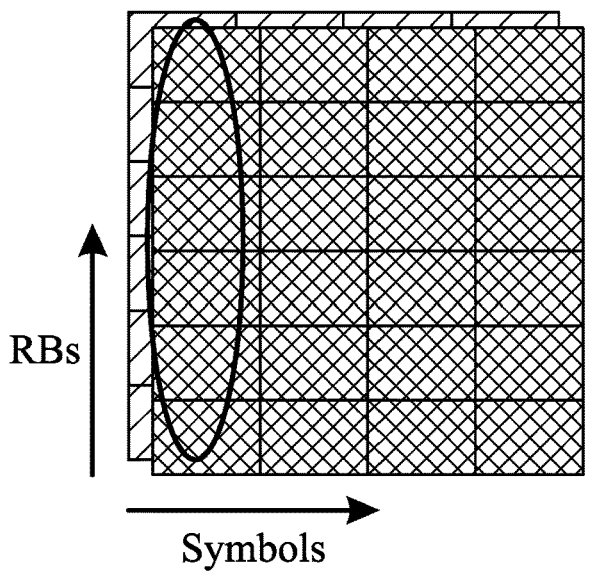
FIG. 6C
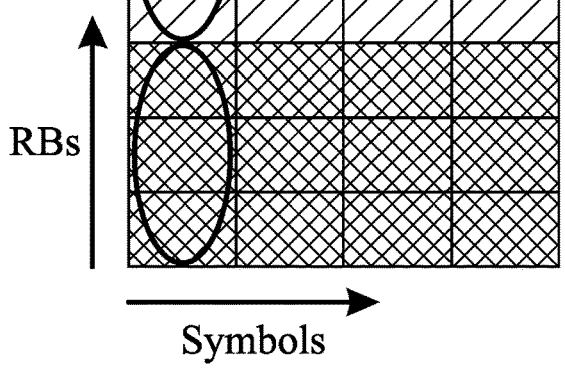
FIG. 6D
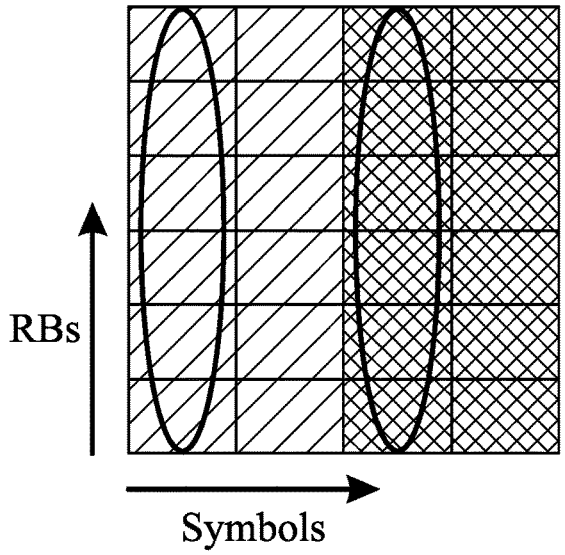
FIG. 6E
○ Symbol Containing DMRS
TCI State/ QCL/TRP 1
TCI State/ QCL/TRP 2
DMRS-max-len=1
Ports: 0,1  2,3
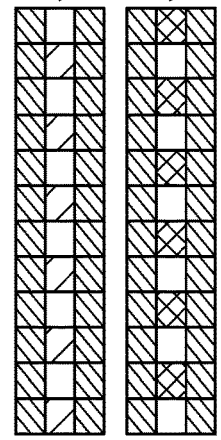
DMRS ports shown in one RB and one symbol

| 16-2h | Two default beams for s-DCI | Two default beams for single-DCI based single-PDSCH, determined as the TCI-states corresponding to the lowest codepoint among the TCI codepoints containing two different TCI states | - | Yes | N/A | - | Per band | TDD only | FR2 only | - | Note: Applicable to FR2 only | Optional with capability signalling |

QCL ASSUMPTION FOR A-CSI-RS CONFIGURED WITH MULTI-TRP

CROSS-REFERENCE TO RELATED APPLICATION

The present application is a continuation of U.S. patent application Ser. No. 17/152,571, filed Jan. 19, 2021, which claims benefit of and priority to U.S. Provisional Patent Application No. 62/976,309, filed Feb. 13, 2020, which is hereby incorporated by reference in its entirety.

BACKGROUND

Field of the Disclosure

Aspects of the present disclosure relate to wireless communications, and more particularly, to techniques for quasi-colocation (QCL) assumption for aperiodic channel state information (A-CSI) reference signal (RS) configured with multiple transmission reception point (mTRP).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved and desirable quasi-colocation (QCL) assumption for aperiodic channel state information (A-CSI) reference signal (RS) configured with multiple transmission reception point (mTRP).

Certain aspects of the subject matter described in this disclosure can be implemented in a method for wireless communication by a user equipment (UE). The method generally includes receiving signaling configuring the UE with a plurality of index values associated with different control resource sets (CORESETS). The method generally includes receiving, from a base station (BS), first downlink control information (DCI) triggering an A-CSI-RS resource set for A-CSI reporting. The first DCI is received in a first CORESET of the different CORESETs associated with a first index value of the plurality of index values. The method generally includes, when a time offset between the first DCI and the A-CSI-RS resource set is smaller than a first threshold time offset, determining a QCL assumption for receiving A-CSI-RS using the A-CSI-RS resource set based, at least in part, on the first index value.

Certain aspects of the subject matter described in this disclosure can be implemented in a method for wireless communication by a BS. The method generally includes configuring a UE with a plurality of index values associated with different CORESETS. The method generally includes sending the UE first DCI triggering an A-CSI-RS resource set for A-CSI reporting. The first DCI is sent in a first CORESET of the different CORESETs. The first DCI is associated with a first index value of the plurality of index values. The method generally includes when a time offset between the first DCI and the A-CSI-RS resource set is smaller than a first threshold time offset, determining a QCL assumption for sending A-CSI-RS using the A-CSI-RS resource set based, at least in part, on the first index value.

Certain aspects of the subject matter described in this disclosure can be implemented in a method for wireless communication by a UE. The method generally includes identifying that a medium access control (MAC) control element (CE) received from a BS indicates that at least one transmission configuration indicator (TCI) codepoint is mapped to two TCI states. The method generally includes receiving, from the BS, first DCI triggering an A-CSI-RS resource set for A-CSI reporting. The method generally includes, when a time offset between the first DCI and the A-CSI-RS resource set is smaller than a first threshold time offset, determining a QCL assumption for receiving an A-CSI-RS using the A-CSI-RS resource set based, at least in part, on the identifying the MAC-CE indicates the at least one TCI codepoint is mapped to two TCI states.

Certain aspects of the subject matter described in this disclosure can be implemented in a method for wireless communication by a BS. The method generally includes identifying that a MAC-C sent to a UE indicates that at least one TCI codepoint is mapped to two TCI states. The method generally includes sending the UE first DCI triggering an A-CSI-RS resource set for A-CSI reporting. The method generally includes, when a time offset between the first DCI and the A-CSI-RS resource set is smaller than a first threshold time offset, determining a QCL assumption for sending an A-CSI-RS using the A-CSI-RS resource set based, at least in part, on the identifying the MAC-CE indicates the at least one TCI codepoint is mapped to two TCI states.

Certain aspects provide an apparatus for wireless communication. The apparatus generally includes means for receiving signaling configuring the apparatus with a plurality of index values associated with different CORESETS. The apparatus generally includes means for receiving, from a BS, first DCI triggering an A-CSI RS resource set for A-CSI reporting, the first DCI received in a first CORESET of the different CORESETs associated with a first index value of the plurality of index values. The apparatus generally includes means for, when a time offset between the first DCI and the A-CSI-RS resource set is smaller than a first threshold time offset, determining a QCL assumption for receiving A-CSI-RS using the A-CSI-RS resource set based, at least in part, on the first index value associated with the first DCI.

Certain aspects provide an apparatus for wireless communication. The apparatus generally includes means for identifying that a MAC CE received from a BS indicates that at least one TCI codepoint is mapped to two TCI states. The apparatus generally includes means for receiving, from the BS, first DCI triggering an A-CSI RS resource set for A-CSI reporting. The apparatus generally includes means for, when a time offset between the first DCI and the A-CSI-RS resource set is smaller than a first threshold time offset, determining a QCL assumption for receiving an A-CSI-RS using the A-CSI-RS resource set based, at least in part, on the identifying the MAC-CE indicates the at least one TCI codepoint is mapped to two TCI states.

Certain aspects provide an apparatus for wireless communication. The apparatus generally includes means for configuring a UE with a plurality of index values associated with different CORESETS. The apparatus generally includes means for sending the UE first DCI triggering an A-CSI RS resource set for A-CSI reporting, the first DCI sent in a first CORESET of the different CORESETs associated with a first index value of the plurality of index values. The apparatus generally includes means for, when a time offset between the first DCI and the A-CSI-RS resource set is smaller than a first threshold time offset, determining a QCL assumption for sending A-CSI-RS using the A-CSI-RS resource set based, at least in part, on the first index value associated with the first DCI.

Certain aspects provide an apparatus for wireless communication. The apparatus generally includes means for identifying that a MAC CE sent to a UE indicates that at least one TCI codepoint is mapped to two TCI states. The apparatus generally includes means for sending the UE first DCI triggering an A-CSI RS resource set for A-CSI reporting. The apparatus generally includes means for, when a time offset between the first DCI and the A-CSI-RS resources is smaller than a first threshold time offset, determining a QCL assumption for sending an A-CSI-RS using the A-CSI-RS resource set based, at least in part, on the identifying the MAC-CE indicates the at least one TCI codepoint is mapped to two TCI states.

Certain aspects provide an apparatus for wireless communication. The apparatus generally includes at least one processor coupled with a memory. The memory comprising code executable by the at least one processor to cause the apparatus to: receive signaling configuring the apparatus with a plurality of index values associated with different CORESETS; receive, from a BS, first DCI triggering an A-CSI RS resource set for A-CSI reporting, the first DCI received in a first CORESET of the different CORESETs associated with a first index value of the plurality of index values; and when a time offset between the first DCI and the A-CSI-RS resource set is smaller than a first threshold time offset, determine a QCL assumption for receiving A-CSI-RS using the A-CSI-RS resource set based, at least in part, on the first index value associated with the first DCI.

Certain aspects provide an apparatus for wireless communication. The apparatus generally includes at least one processor coupled with a memory. The memory comprising code executable by the at least one processor to cause the apparatus to: identify that a MAC CE received from a BS indicates that at least one TCI codepoint is mapped to two TCI states; receive, from the BS, first DCI triggering an A-CSI RS resource set for A-CSI reporting; and when a time offset between the first DCI and the A-CSI-RS resource set is smaller than a first threshold time offset, determine a QCL assumption for receiving an A-CSI-RS using the A-CSI-RS resource set based, at least in part, on the identifying the MAC-CE indicates the at least one TCI codepoint is mapped to two TCI states.

Certain aspects provide an apparatus for wireless communication. The apparatus generally includes at least one processor coupled with a memory. The memory comprising code executable by the at least one processor to cause the apparatus to: configure a UE with a plurality of index values associated with different CORESETS; send the UE first DCI triggering an A-CSI RS resource set for A-CSI reporting, the first DCI sent in a first CORESET of the different CORESETs associated with a first index value of the plurality of index values; and when a time offset between the first DCI and the A-CSI-RS resource set is smaller than a first threshold time offset, determine a QCL assumption for sending A-CSI-RS using the A-CSI-RS resource set based, at least in part, on the first index value associated with the first DCI.

Certain aspects provide an apparatus for wireless communication. The apparatus generally includes at least one processor coupled with a memory. The memory comprising code executable by the at least one processor to cause the apparatus to: identify that a MAC CE sent to a UE indicates that at least one TCI codepoint is mapped to two TCI states; send the UE first DCI triggering an A-CSI RS resource set for A-CSI reporting; and when a time offset between the first DCI and the A-CSI-RS resource set is smaller than a first threshold time offset, determine a QCL assumption for sending an A-CSI-RS using the A-CSI-RS resource set based, at least in part, on the identifying the MAC-CE indicates the at least one TCI codepoint is mapped to two TCI states.

Certain aspects provide a computer readable medium having code stored thereon for wireless communications by a UE. The code is executable by at least one processor to cause the UE to: receive signaling configuring the UE with a plurality of index values associated with different CORESETS; receive, from a BS, first DCI triggering an A-CSI RS resource set for A-CSI reporting, the first DCI received in a first CORESET of the different CORESETs associated with a first index value of the plurality of index values; and when a time offset between the first DCI and the A-CSI-RS resource set is smaller than a first threshold time offset, determine a QCL assumption for receiving A-CSI-RS using the A-CSI-RS resource set based, at least in part, on the first index value associated with the first DCI.

Certain aspects provide a non-transitory computer readable medium having code stored thereon for wireless communications by a UE. The code is executable by at least one processor to cause the UE to: identify that a MAC CE received from a BS indicates that at least one TCI codepoint is mapped to two TCI states; receive, from the BS, first DCI triggering an aperiodic A-CSI RS resource set for A-CSI reporting; and when a time offset between the first DCI and the A-CSI-RS resource set is smaller than a first threshold time offset, determine a QCL assumption for receiving an A-CSI-RS using the A-CSI-RS resource set based, at least in part, on the identifying the MAC-CE indicates the at least one TCI codepoint is mapped to two TCI states.

Certain aspects provide a non-transitory computer readable medium having code stored thereon for wireless communications by a BS. The code is executable by at least one processor to cause the BS to: configure a UE with a plurality of index values associated with different CORESETS; send the UE first DCI triggering an A-CSI RS resource set for A-CSI reporting, the first DCI sent in a first CORESET of the different CORESETs associated with a first index value of the plurality of index values; and when a time offset between the first DCI and the A-CSI-RS resource set is smaller than a first threshold time offset, determine a QCL assumption for sending A-CSI-RS using the A-CSI-RS resource set based, at least in part, on the first index value associated with the first DCI.

Certain aspects provide a non-transitory computer readable medium having code stored thereon for wireless communications by a BS. The code executable by at least one processor to cause the BS to: identify that a MAC CE sent to a UE indicates that at least one TCI codepoint is mapped to two TCI states; send the UE first DCI triggering an A-CSI RS resource set for A-CSI reporting; and when a time offset between the first DCI and the A-CSI-RS resource set is smaller than a first threshold time offset, determine a QCL assumption for sending an A-CSI-RS using the A-CSI-RS resource set based, at least in part, on the identifying the MAC-CE indicates the at least one TCI codepoint is mapped to two TCI states.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5C is an example default QCL assumption for mDCI mTRP for PDSCH, in accordance with certain aspects of the present disclosure.

FIG. 6C is an example single-DCI mTRP scenario with spatial division multiplexing (SDM) of the TRPs, in accordance with certain aspects of the present disclosure.

FIG. 6D is an example single-DCI mTRP scenario with frequency division multiplexing (FDM) of the TRPs, in accordance with certain aspects of the present disclosure.

FIG. 6E is an example single-DCI mTRP scenario with time division multiplexing (TDM) of the TRPs, in accordance with certain aspects of the present disclosure.

FIG. 6F is an example default QCL assumption for single-DCI mTRP for PDSCH, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
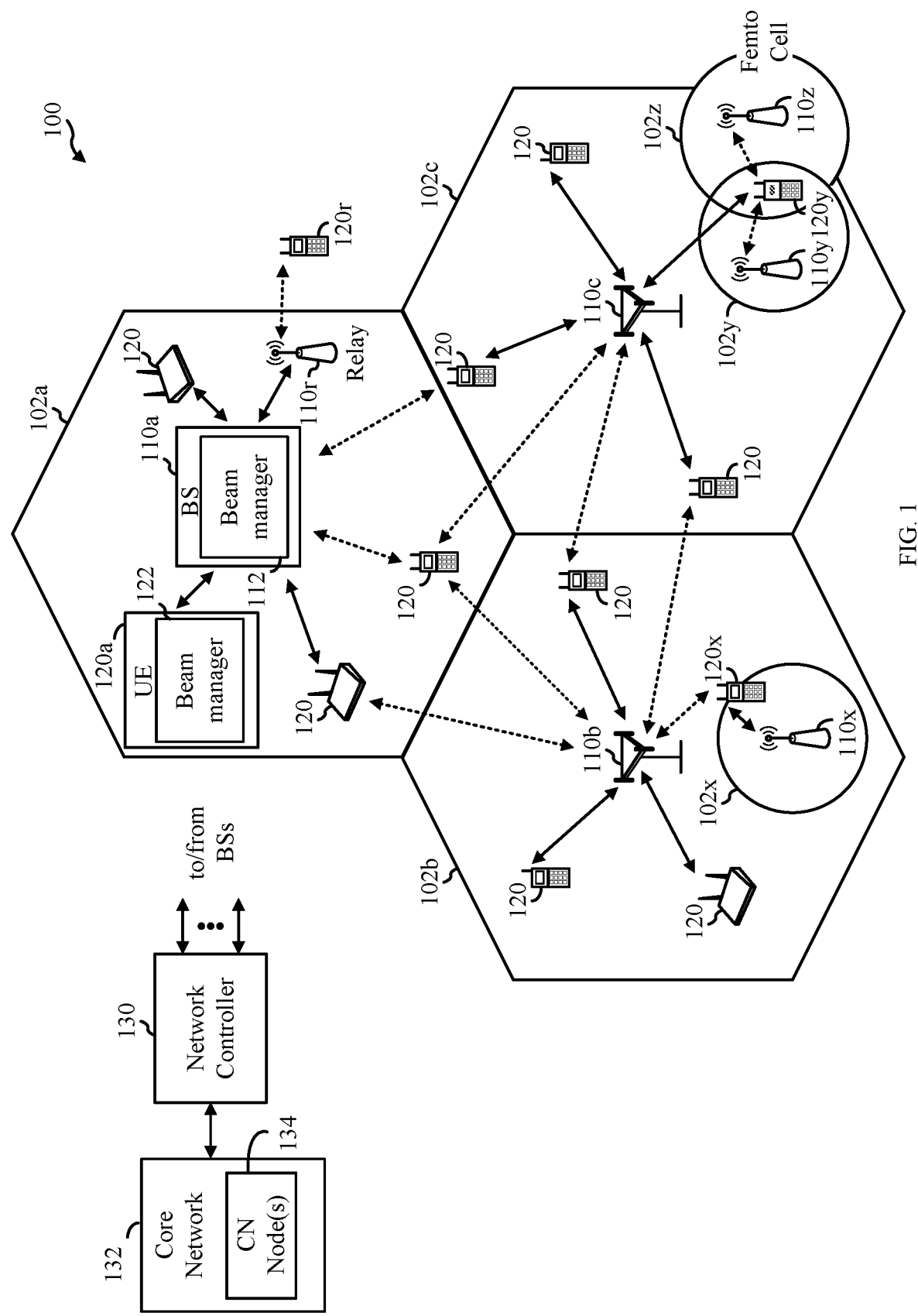
FIG. 1 is a block diagram conceptually illustrating an example telecommunications system, in accordance with certain aspects of the present disclosure.

Aspects of the present disclosure provide apparatus, methods, processing systems, and computer readable mediums for quasi-colocation (QCL) assumption for aperiodic channel state information (A-CSI) reference signal (RS) configured with multiple transmission reception point (mTRP).

In certain systems, A-CSI reporting may be configured and associated with A-CSI-RS resource sets. In some examples, the A-CSI reporting is configured with mTRP. What is needed are techniques for determining the QCL assumption for the A-CSI-RS, for example, in cases where the UE supports simultaneous reception with two beams and two default QCL assumptions.

The following description provides examples of QCL assumption for A-CSI-RS configured with mTRP in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

Example Telecommunications System

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. Multiple input multiple output (MIMO) transmissions with precoding may also be supported. MIMO configurations in the DL may support up to 8 transmit antennas with multi-layer downlink (DL) transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured for for aperiodic channel state information (A-CSI) reporting with multiple transmit/receive points (mTRP). As shown in FIG. 1, the BS 110a includes a beam manager 112 that may be configured for QCL assumption for A-CSI RS configured with mTRP, in accordance with aspects of the present disclosure. The UE 120a includes a beam manager 122 that may be configured for for QCL assumption for A-CSI RS configured with mTRP, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
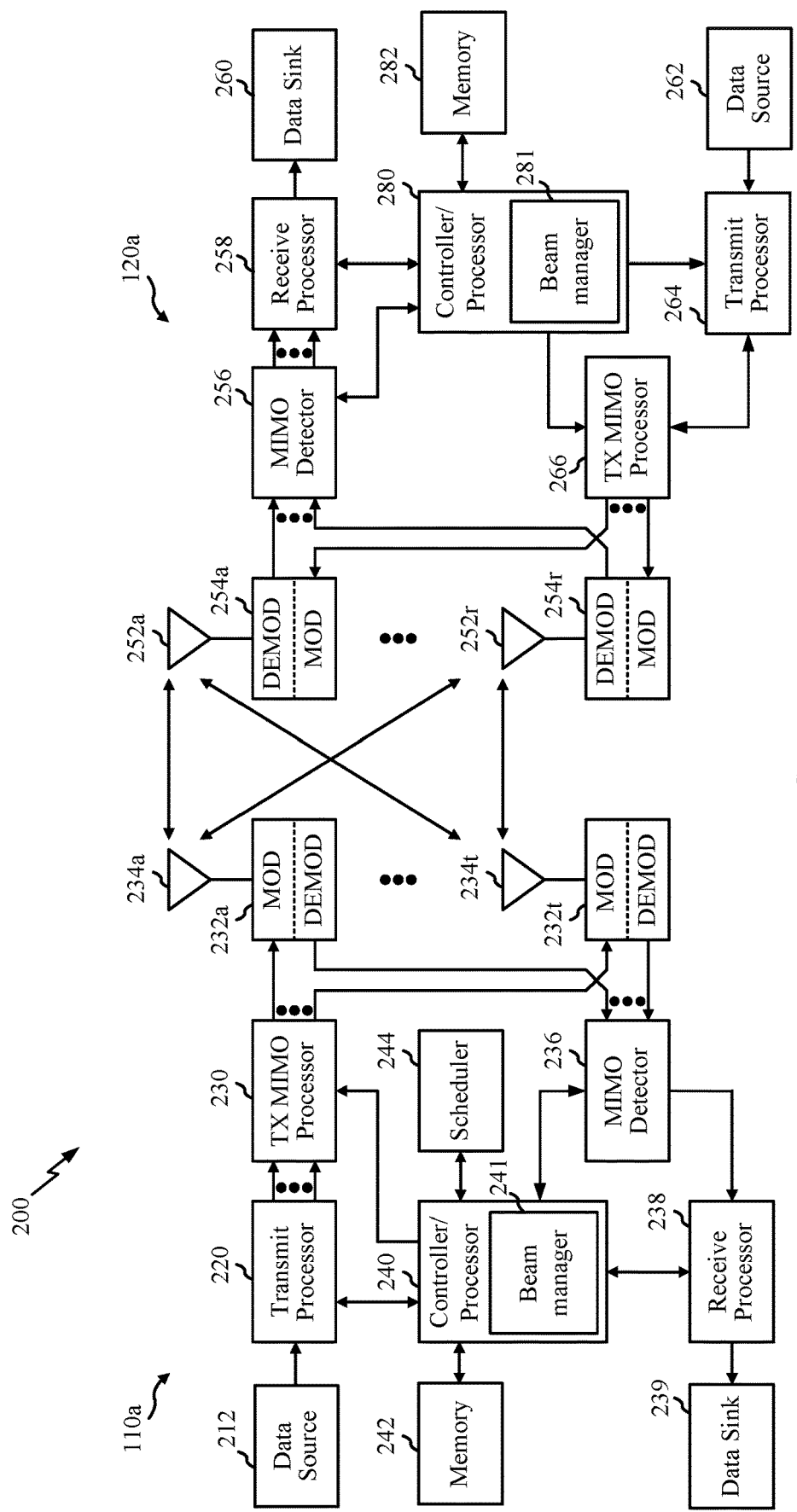
FIG. 2 is a block diagram conceptually illustrating a design of an example a base station (BS) and user equipment (UE), in accordance with certain aspects of the present disclosure.

FIG. 2 illustrates example components of a BS 110a and a UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for a physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232 may process a respective output symbol stream (e.g., for OFDM, etc.) to obtain an output sample stream. Each MOD in transceivers 432 may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive the DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 454 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a transmit MIMO processor 266 if applicable, further processed by the DEMODs in transceivers 254a-254r (e.g., for SC-FDM, etc.), and transmitted to the BS 110a. At the BS 110a, the UL signals from the UE 120a may be received by the antennas 234, processed by the MOD in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or the UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a beam manager 241 that may be configured for QCL assumption for A-CSI-RS configured with mTRP, according to aspects described herein. As shown in FIG. 2, the controller/processor 280 of the UE 120a has a beam manager 281 that may be configured for QCL assumption for A-CSI-RS configured with mTRP, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the UL and the DL. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
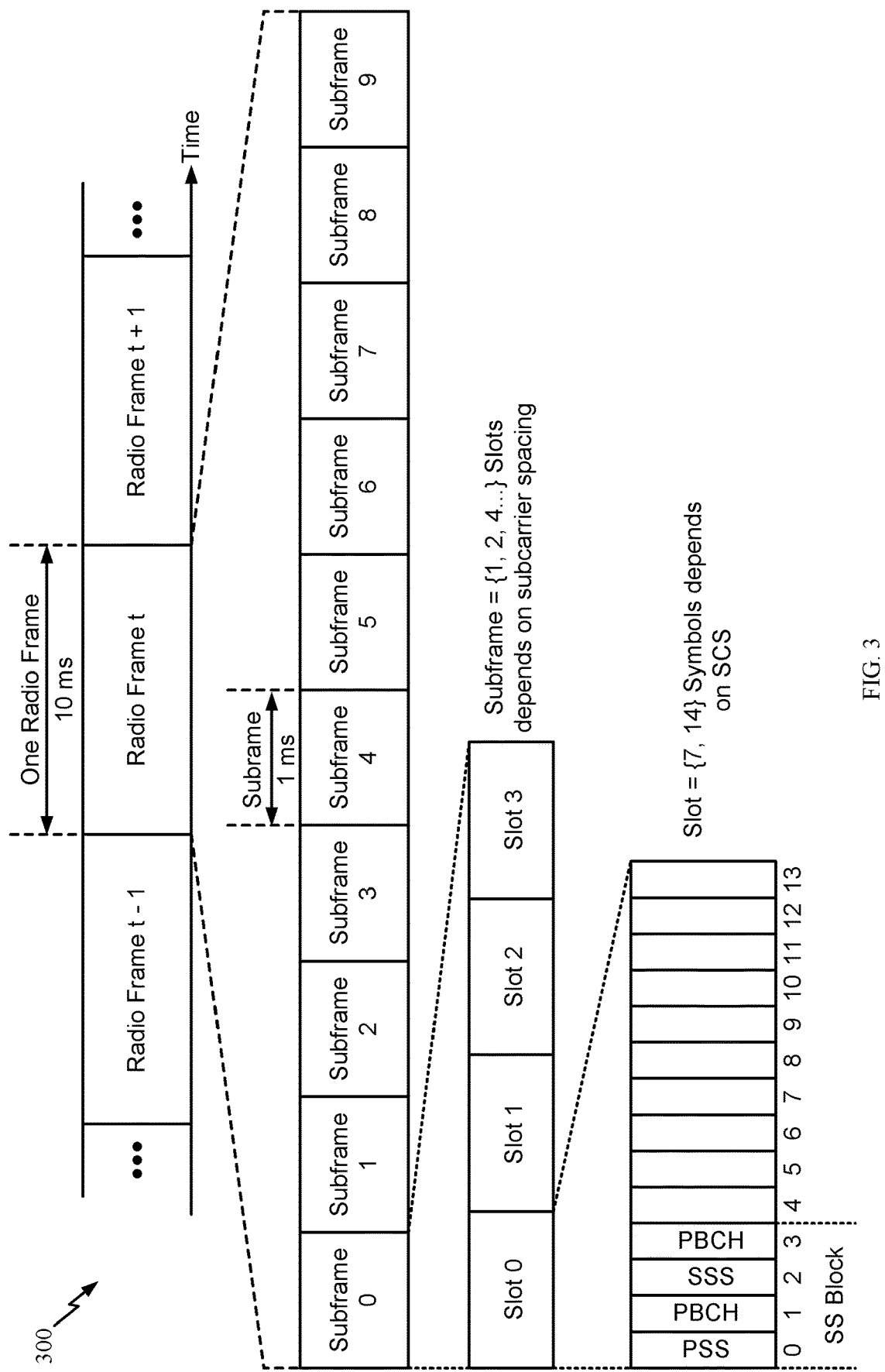
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A sub-slot structure refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Example CSI Reporting Configuration

Channel state information (CSI) may refer to channel properties of a communication link. The CSI may represent the combined effects of, for example, scattering, fading, and power decay with distance between a transmitter and a receiver. Channel estimation using pilots, such as CSI reference signals (CSI-RS), may be performed to determine these effects on the channel. The CSI may be used to adapt transmissions based on current channel conditions, which is useful for achieving reliable communication, in particular, with high data rates in multi-antenna systems. The CSI is typically estimated at the receiver, quantized, and fed back to the transmitter.

A UE (e.g., such as a UE 120a in the wireless communication network 100 of FIG. 1) may be configured by a BS (e.g., such as a BS 110 in the wireless communication network 100 of FIG. 1) for CSI reporting. The BS may configure the UE with a CSI reporting configuration or with multiple CSI report configurations. The BS may provide the CSI reporting configuration to the UE via higher layer signaling, such as radio resource control (RRC) signaling (e.g., via a CSI-ReportConfig information element (IE)).

Each CSI report configuration may be associated with a single downlink (DL) bandwidth part (BWP). The CSI report setting configuration may define a CSI reporting band as a subset of subbands of the BWP. The DL BWP may be indicated by a higher layer parameter (e.g., bwp-Id) in the CSI report configuration for channel measurement (CM) and contains parameter(s) for one CSI reporting band, such as codebook configuration, time-domain behavior, frequency granularity for the CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

The CSI report configuration may configure time and frequency resources used by the UE to report CSI. For example, the CSI report configuration may be associated with CSI-RS resources for CM, interference measurement (IM), or both. The CSI report configuration may configure the CSI-RS resources for measurement (e.g., via a CSI-ResourceConfig IE). The CSI-RS resources provide the UE with the configuration of CSI-RS ports, or CSI-RS port groups, mapped to time and frequency resources (e.g., resource elements (REs)). The CSI-RS resources can be zero power (ZP) or non-zero power (NZP) resources. At least one NZP CSI-RS resource may be configured for the CM. For interference measurement, it can be NZP CSI-RS or zero power CSI-RS, which is known as CSI-IM (note, if NZP CSI-RS, it is called NZP CSI-RS for interference measurement, if zero power, it is called CSI-IM)

The CSI report configuration may configure the UE for aperiodic, periodic, or semi-persistent CSI reporting. For periodic CSI, the UE may be configured with periodic CSI-RS resources. Periodic CSI and semi-persistent CSI report on a physical uplink control channel (PUCCH) may be triggered via a RRC or a medium access control (MAC) control element (CE). For aperiodic and semi-persistent CSI on a physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on the PUSCH may be provided via downlink control information (DCI). The CSI-RS trigger may be signaling indicating to the UE that CSI-RS will be transmitted for the CSI-RS resource. The UE may report the CSI feedback based on the CSI report configuration and the CSI report trigger. For example, the UE may measure the channel associated with the CSI for the triggered CSI-RS resources. Based on the measurements, the UE may select a preferred CSI-RS resource. The UE reports the CSI feedback for the selected CSI-RS resource.

The CSI report configuration can also configure the CSI parameters (sometimes referred to as quantities) to be reported. Codebooks may include Type I single panel, Type I multi-panel, and Type II single panel. Regardless which codebook is used, the CSI report may include at least a channel quality indicator (CQI), a precoding matrix indicator (PMI), a CSI-RS resource indicator (CRI), and a rank indicator (RI). The structure of the PMI may vary based on the codebook. The CRI, the RI, and the CQI may be in a first part (Part I) and the PMI may be in a second part (Part II) of the CSI report.

For the Type I single panel codebook, the PMI may include a W1 matrix (e.g., a subest of beams) and a W2 matrix (e.g., a phase for cross polarization combination and beam selection). For the Type I multi-panel codebook, compared to type I single panel codebook, the PMI further comprises a phase for cross panel combination. The BS may have a plurality of transmit beams. The UE can feed back to the BS an index of a preferred beam, or beams, of the candidate beams. For example, the UE may feed back the precoding vector w for the l-th layer:

$$w_l = \begin{pmatrix} b_{+45pol} \\ \varphi \cdot b_{-45pol} \end{pmatrix},$$

where b represents the oversampled beam (e.g., discrete Fourier transform (DFT) beam), for both polarizations, and φ is the co-phasing.

For the Type II codebook (e.g., which may be designed for single panel), the PMI is a linear combination of beams; it has a subset of orthogonal beams to be used for linear combination and has per layer, per polarization, amplitude and phase for each beam. The preferred precoder for a layer can be a combination of beams and associated quantized coefficients, and the UE can feedback the selected beams and the coefficients to the BS.

The UE may report the CSI feedback based on the CSI report configuration and the CSI report trigger. For example, the UE may measure the channel associated with the CSI for the triggered CSI-RS resources. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Example mTRP

In certain wireless system, transmissions may be via multiple transmission configuration indicator (TCI) states. In some examples, a TCI state is associated with a beam pair, an antenna panel, antenna ports, antenna port groups, a quasi-colocation (QCL) relation, and/or a transmission reception point (TRP). Multi-TCI state transmission may be associated with multiple beam pairs, multiple antenna panels, and/or multiple QCL relations, which may be associated with one or more multiple TRPs (mTRPs). The TCI state indicates the QCL assumption that a user equipment (UE) may use for channel estimation.

In some examples, the TCI state may generally indicate to the UE an association between a downlink (DL) reference signal to a corresponding QCL type which may allow the UE to determine a receive beam to use for receiving a transmission. The QCL-type may be associated with a combination (e.g., set) of QCL parameters. In some examples, a QCL-TypeA indicates the ports are QCL'd with respect to Doppler shift, Doppler spread, average delay, and delay spread; QCL-TypeB indicates the ports are QCL'd with respect to Doppler shift, and Doppler spread; QCL-TypeC indicates the ports are QCL'd with respect to average delay and Doppler shift; and QCL-TypeD indicates the ports are QCL'd with respect to Spatial Rx parameter. Different groups of ports can share different sets of QCL parameters.

In some examples, for a multi-TCI state scenario, a same transport block (TB)/code block (CB) (e.g., same information bits but can be different coded bits) is transmitted from multiple TCI states, such as two or more TRPs in multi-TRP scenario. The UE considers the transmissions from both TCI states and jointly decodes the transmissions. In some examples, the transmissions from the TCI states is at the same time (e.g., in the same slot, mini-slot, and/or in the same symbols), but across different resource blocks (RBs) and/or different layers. The number of layers from each TCI state can be the same or different. In some examples, for the same codeword (i.e., the same transport block/codeblock) mTRP transmission, the modulation order may be the same. For an mTRP transmission involving different codewords (e.g., two codewords from the two TRPs), then the each codeword may be associated with a rank, modulation, and resource allocation (e.g., referred to as a multi-DCI based mTRP transmission). In some examples, the transmissions from the TCI states can be at different times (e.g., in two consecutive mini-slots or slots). In some examples, the transmissions from the TRPs can be a combination of the above.

Example QCL Assumption for Single-TRP PDSCH

Figure 4:
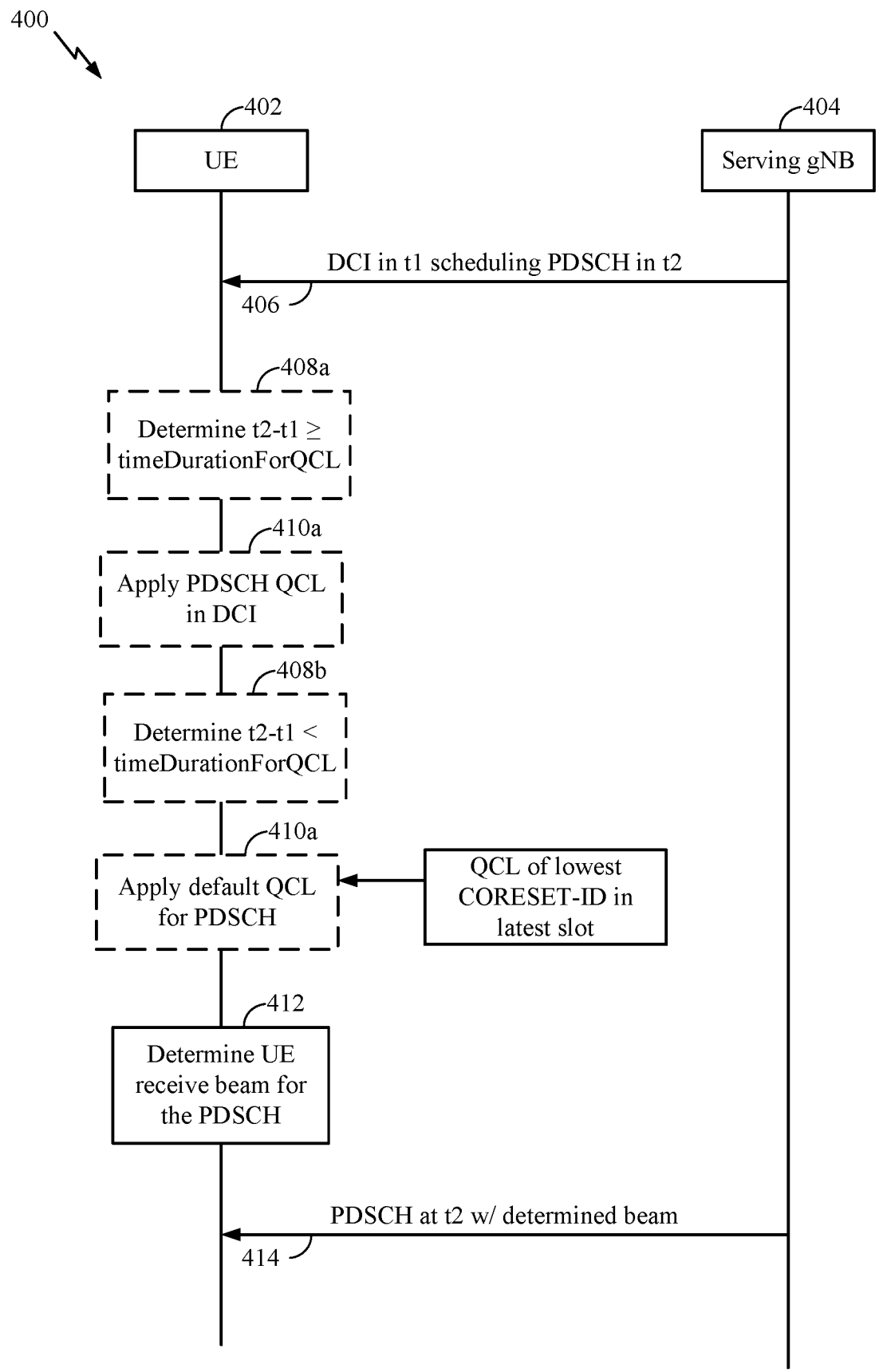
FIG. 4 is a call flow diagram illustrating example signaling for a single transmission reception point (TRP) physical downlink shared channel (PDSCH) quasi-colocation (QCL) assumption, in accordance with certain aspects of the present disclosure.

FIG. 4 is a call flow diagram illustrating example signaling 400 for a single-transmission reception point (TRP) physical downlink shared channel (PDSCH) quasi-colocation (QCL) assumption.

In certain wireless systems (e.g., Release 15 systems), multiple (e.g., up to 8) transmission configuration indicator (TCI) states can be activated for the PDSCH. As shown in FIG. 4, at 406, a user equipment (UE) 402 receives a downlink control information (DCI) (with a last symbol of the DCI at t1) from a base station (BS) 404 scheduling a PDSCH (with a first symbol of the PDSCH at t2). A TCI field in the DCI may indicate a TCI state for the scheduled PDSCH.

The UE 402 may apply the indicated TCI state or a default QCL assumption, based on whether a time duration between the scheduled PDSCH and the DCI satisfies a threshold. For example, the threshold may be a "timeDurationForQCL" threshold. The UE 402 may report the threshold (e.g., 14 or 28 OFDM symbols) to the BS 404 as a UE capability.

As shown in FIG. 4, if the UE 402 determines, at 408a, a time offset between a reception of the DCI and a corresponding PDSCH is equal to or larger than the threshold (e.g., timeDurationForQCL), then the UE 402 may apply the TCI state indicated in the DCI for the PDSCH at 410a. For example, the UE 402 can determine a receive beam for receiving the PDSCH based on the indicated TCI state, at 412. This may be because the UE 402 has enough time to decode the DCI and prepare the beam based on the indicated TCI state in the DCI before receiving the PDSCH.

If the UE 402 determines, at 408b, that the time offset is less than the threshold (e.g., timeDurationForQCL), then the UE 402 applies a default QCL assumption (e.g., QCL-TypeD) for the PDSCH, at 410b. For example, the UE 402 can determine the receive beam for receiving the PDSCH based on the default QCL, at 412.

The default QCL assumption for the PDSCH may be a QCL/TCI state of a control resource set (CORESET) associated with a monitored search space with a lowest CORESET identifier (ID) in a latest slot in which one or more CORESETs within an active bandwidth part (BWP) of a serving cell are monitored by the UE 402.

Stated otherwise, if all TCI codepoints are mapped to a single TCI state and an offset between a reception of a downlink (DL) DCI and a corresponding PDSCH is less than the threshold timeDurationForQCL, the UE 402 may assume that demodulation reference signal (DM-RS) ports of the PDSCH of a serving cell are quasi co-located (QCL'd) with the RS(s) with respect to the QCL parameter(s) used for PDCCH QCL indication of the CORESET associated with a monitored search space with the lowest controlResourceSetId in the latest slot in which one or more CORESETs within the active BWP of the serving cell are monitored by the UE 402.

At 414, the UE 402 receives the PDSCH (at t2) from the BS 404 using the determined received beam.

Example QCL Assumption for mDCI mTRP PDSCH

Figure 5A:
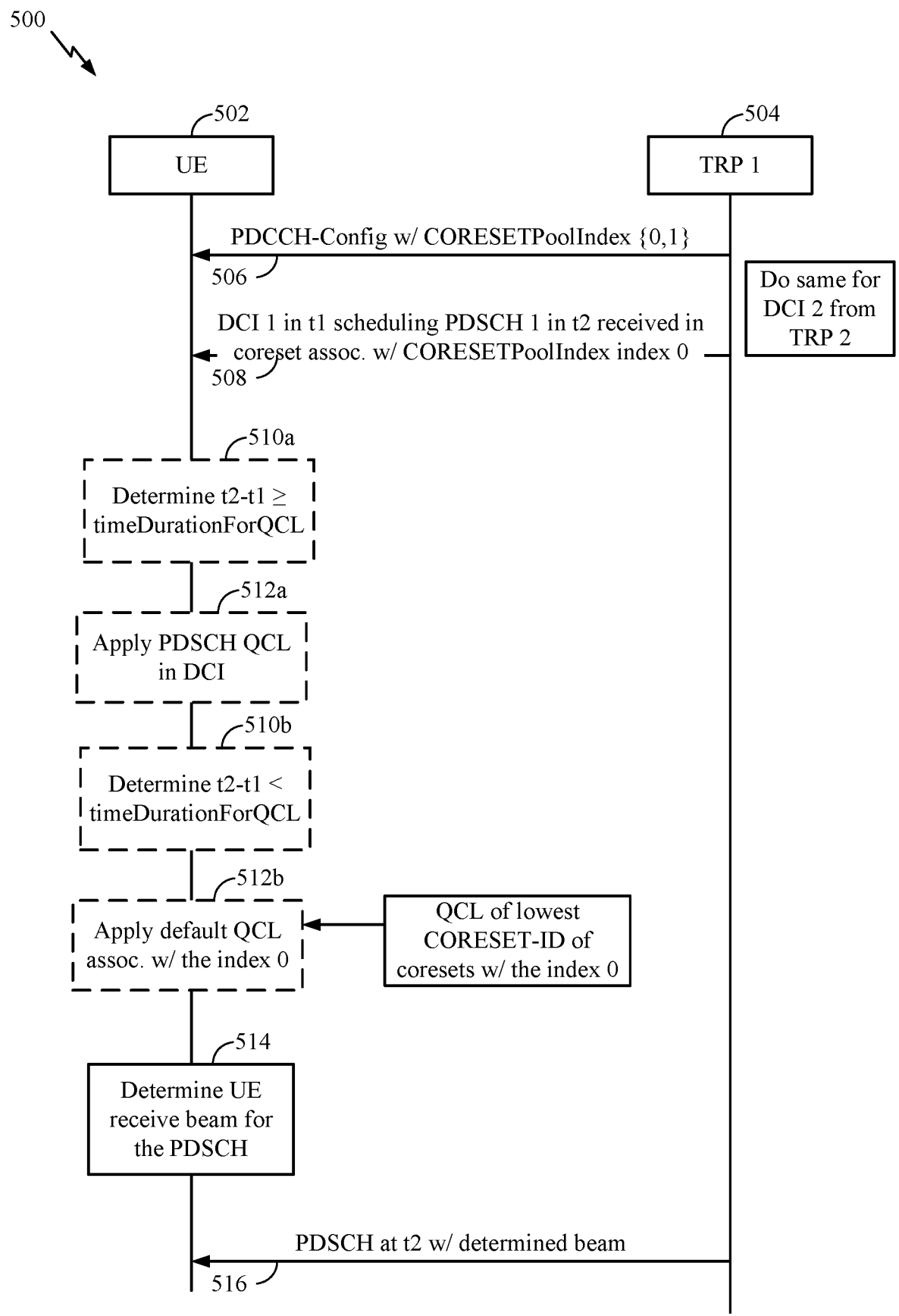
FIG. 5A is a call flow diagram illustrating example signaling for a multiple downlink control information (DCI) multiple TRP (mTRP) PDSCH QCL assumption, in accordance with certain aspects of the present disclosure.

FIG. 5A is a call flow diagram illustrating example signaling 500 for a multiple downlink control information (mDCI) multiple transmission reception point (mTRP) physical downlink shared channel (PDSCH) quasi-colocation (QCL) assumption.

Figure 5B:
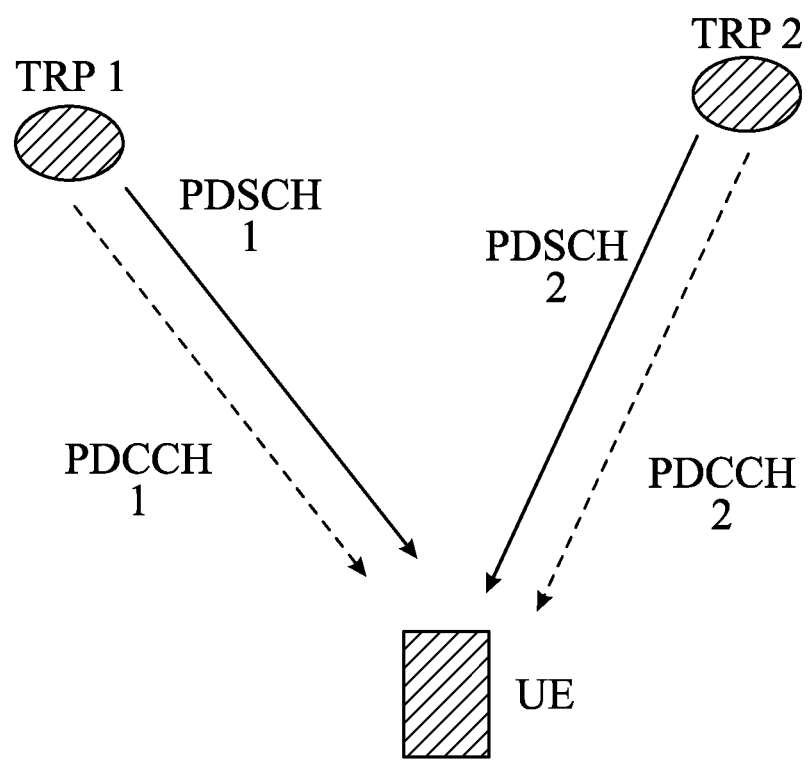
FIG. 5B is an example mDCI mTRP scenario, in accordance with certain aspects of the present disclosure.

In certain wireless systems (e.g., Release 16 systems), a PDSCH may be transmitted by multiple TRPs and scheduled by multiple DCIs. For example, as shown in FIG. 5B, a first DCI (e.g., a DCI1) transmitted from a first TRP (e.g., TRP1 504 associated with a base station (BS)) schedules a first PDSCH (e.g., PDSCH1) from the first TRP, and a second DCI (e.g., a DCI2) transmitted from a second TRP (e.g., TRP2) schedules a second PDSCH (e.g., PDSCH2) from the second TRP.

The TRP differentiation at a user equipment (UE)-side may be based on an index value associated with the DCIs. For example, a UE 502 may receive a configuration of index values. As shown in FIG. 5A, at 506, the UE 502 receives a configuration (e.g., a PDCCH-config RRC parameter) with the index values (e.g., CORESETPoolIndex values) from the TRP 1 504 (or TRP 2 or both). Each control resource set (CORESET) (e.g., up to 5 CORESETs) can be configured with a value of the CORESETPoolIndex, which may be 0 or 1. Thus, the CORESETS may be separated into two groups (e.g., a group of CORESETS associated with the CORESETPoolIndex value 0 and a group of CORESETS associated with the CORESETPoolIndex value 1).

As shown in FIG. 5A, at 508, the UE 502 receives a DCI (at t1) from the BS scheduling a PDSCH (at t2). The DCI may indicate a transmission configuration indicator (TCI) state for the scheduled PDSCH. The DCI may be received in a CORESET associated with one of the CORESETPoolIndex values (e.g., 0 in the example in FIG. 5A). Thus, the UE knows the CORESET and CORESETPoolIndex value associated with the DCI. The CORESETPoolIndex value of the CORESET in which the DCI is received may be used for different purposes, such as hybrid automatic repeated request (HARQ)-Ack codebook construction and transmission, PDSCH scrambling, and the like.

The UE 502 may apply the indicated TCI state or a default QCL assumption, based on whether a time duration between the scheduled PDSCH and the DCI satisfies a threshold. For example, the threshold may be a "timeDurationForQCL" threshold. The UE 502 may report the threshold (e.g., 14 or 28 OFDM symbols) to the BS as a UE capability.

As shown in FIG. 5A, if the UE 502 determines, at 510*a*, a time offset between a reception of the DCI 1 and a corresponding PDSCH is equal to or larger than the threshold (e.g., timeDurationForQCL), then the UE 502 may apply the TCI state indicated in the DCI for the PDSCH, at 512*a*. For example, the UE 502 can determine the receive beam for receiving the PDSCH based on the indicated TCI state, at 514.

If the UE 502 determines, at 510*b*, that the time offset is less than the threshold (e.g., timeDurationForQCL), then the UE 502 applies a default QCL assumption for the PDSCH, at 512*b*. For example, the UE 502 can determine the receive beam for receiving the PDSCH based on the default QCL, at 514.

The UE 502 may maintain two default QCL assumption corresponding to a lowest CORESET ID within each CORESET group, as shown in FIG. 5C. The two default QCL assumption may be a UE capability, which may be conditioned on another UE capability to receive two beams simultaneously (e.g., in a frequency range (FR2), a millimeter wave (mmWave) frequency range). For example, the UE 502 may support mDCI in FR2, but not support two simultaneous beams reception and/or not support two default QCL assumptions. In the example in FIG. 5A, the default QCL assumption is the QCL assumption of the lowest CORESET-ID of the CORESETs with the index value 0.

Stated otherwise, if the UE 502 configured by a higher layer parameter PDCCH-Config that contains two different values of CORESETPoolIndex in ControlResourceSet, if the time offset between the reception of the DL DCI and the corresponding PDSCH is less than the threshold timeDurationForQCL, the UE may assume that demodulation reference signal (DM-RS) ports of the PDSCH associated with a value of CORESETPoolIndex of a serving cell are QCL'd with the RS(s) with respect to QCL parameter(s) used for an PDCCH QCL indication of the CORESET associated with a monitored search space with the lowest CORESET-ID among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE 502.

At 516, the UE 502 receives the PDSCH (at t2) from the BS using the determined received beam.

Example QCL Assumption for Single-DCI mTRP PDSCH

Figure 6A:
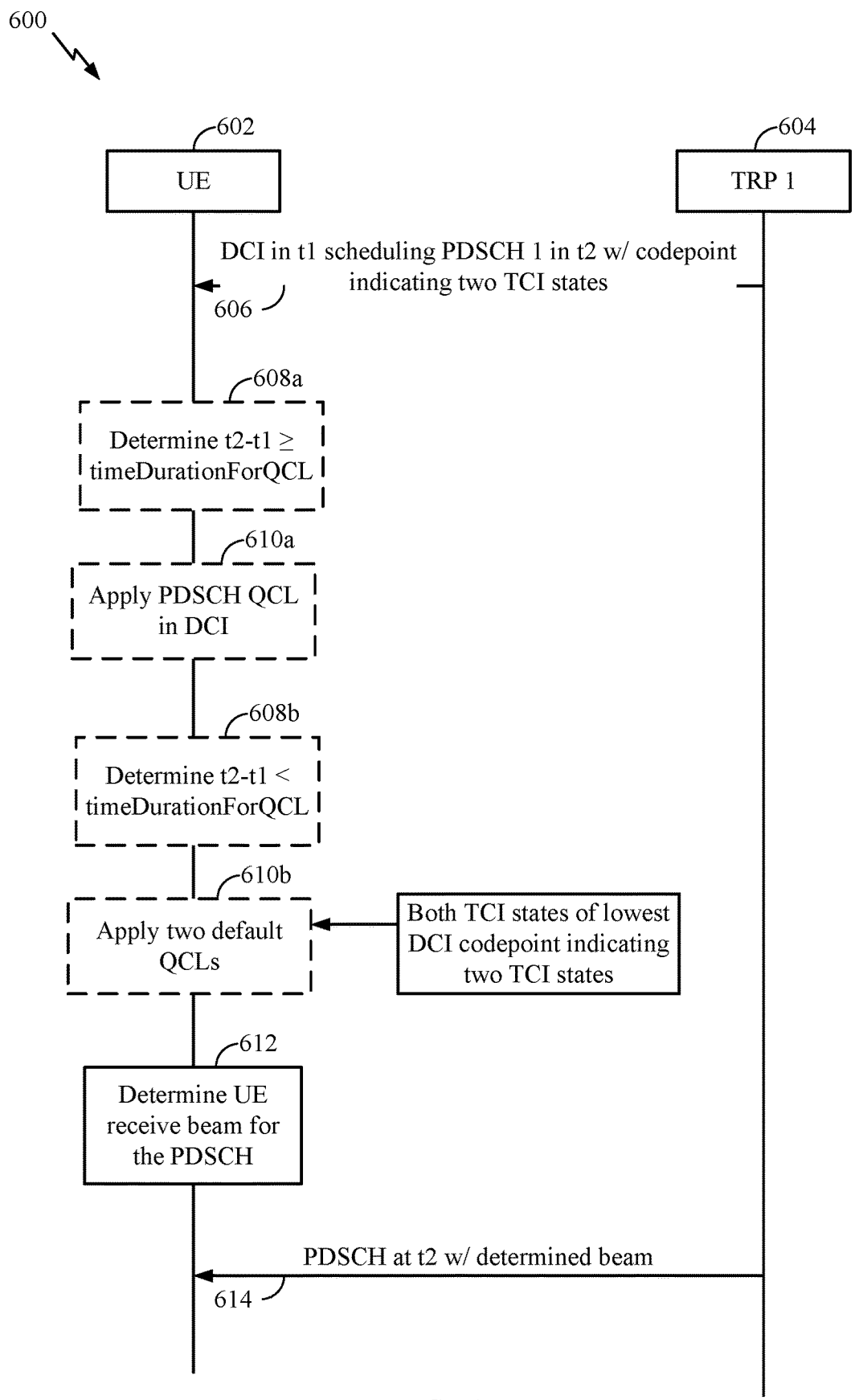
FIG. 6A is a call flow diagram illustrating example signaling for a single-DCI mTRP PDSCH QCL assumption, in accordance with certain aspects of the present disclosure.

FIG. 6A is a call flow diagram illustrating example signaling 600 for a single-downlink control information (DCI) multiple transmission reception point (mTRP) physical downlink shared channel (PDSCH) quasi-colocation (QCL) assumption.

In certain wireless systems (e.g., Release 16 systems), a PDSCH may be transmitted by multiple TRPs and scheduled by a single DCI.

Figure 6B:
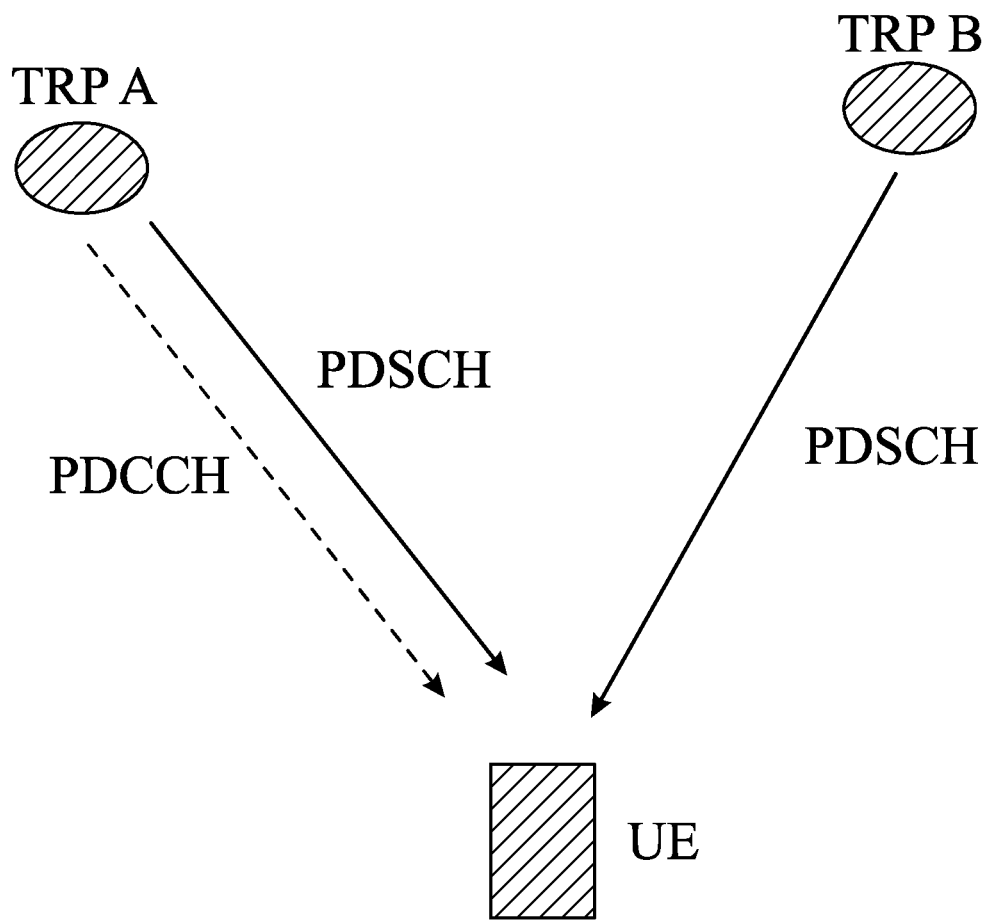
FIG. 6B is an example single-DCI mTRP scenario, in accordance with certain aspects of the present disclosure.

For example, as shown in FIG. 6B, a DCI (e.g., on a PDCCH) transmitted from a first TRP (e.g., TRP A) schedules a PDSCH from both the first TRP (e.g., TRP A) and a second TRP (e.g., TRP B), where the PDSCH is a multi-state PDSCH. In some examples, the different TRPs transmit the PDSCH using spatial division multiplexing (SDM) as shown in FIG. 6C. For example, the different TRPs transmit using different spatial layers in overlapping resource blocks (RBs)/symbols and with different transmission configuration indicator (TCI) states. In some examples, the different TRPs transmit the PDSCH using frequency division multiplexing (FDM) as shown in FIG. 6D. For example, the different TRPs transmit using different RBs and with different TCI states. In some examples, the different TRPs transmit the PDSCH using time division multiplexing (TDM) as shown in FIG. 6E. For example, the different TRPs transmit using different OFDM symbols (e.g., in different mini-slots or slots) and with different TCI states. Different repetitions may be transmitted within a slot and/or different repetitions in different slots.

Each TCI codepoint in the DCI (e.g., corresponding to a TCI field value in the DCI) can indicate one TCI state or two TCI states for the PDSCH. Accordingly, the scheduled PDSCH can have two TCI states (e.g., corresponding to the two TRPs). As shown in FIG. 6A, at 606, a user equipment (UE) 602 receives a DCI (at t1) from a TRP1 604 at a base station (BS) scheduling a PDSCH (at t2) and the DCI has a codepoint that indicates two TCI states.

The UE 602 may apply the indicated TCI state or a default QCL assumption, based on whether a time duration between the scheduled PDSCH and the DCI satisfies a threshold. For example, the threshold may be a "timeDurationForQCL" threshold. The UE 602 may report the threshold (e.g., 14 or 28 OFDM symbols) to the BS as a UE capability.

As shown in FIG. 6A, if the UE 602 determines, at 608*a*, a time offset between the reception of the DCI and the corresponding PDSCH is equal to or larger than the threshold (e.g., timeDurationForQCL), then the UE 602 may apply the TCI state indicated in the DCI for the PDSCH, at 610a. For example, the UE 602 can determine the receive beam for receiving the PDSCH based on the indicated TCI state, at 612.

If the UE 602 determines, at 608b, that the time offset is less than the threshold (e.g., timeDurationForQCL), then the UE 602 applies a default QCL assumption for the PDSCH at 610b. For example, the UE 602 can determine the receive beam for receiving the PDSCH based on the default QCL, at 614.

The UE 602 may maintain two default QCL assumptions, as shown in FIG. 6F. The two default QCL assumption may be a UE capability, which may be conditioned on another UE capability to receive two beams simultaneously (e.g., in a frequency range (FR2), a millimeter wave (mmWave) frequency range). For example, the UE 602 may support mDCI in FR2, but not support two simultaneous beams reception and/or not support two default QCL assumptions. The default QCL assumption may correspond to the TCI states of lowest DCI codepoint of the DCI codepoints indicating two TCI states.

Stated otherwise, if the offset between the reception of a downlink (DL) DCI and a corresponding PDSCH is less than the threshold timeDurationForQCL and at least one configured TCI states for the serving cell of scheduled PDSCH contains the 'QCL-TypeD', and at least one TCI codepoint indicates two TCI states, the UE 602 may assume that demodulation reference signal (DM-RS) ports of PDSCH of a serving cell are QCL'd with reference signals (RS(s)) with respect to the QCL parameter(s) associated with the TCI states corresponding to the lowest codepoint among the TCI codepoints containing two different TCI states.

At 614, the UE 602 receives the PDSCH (at t2) from the BS using the determined received beam.

Example QCL Assumption for Single-TRP A-CSI-RS

Figure 7A:
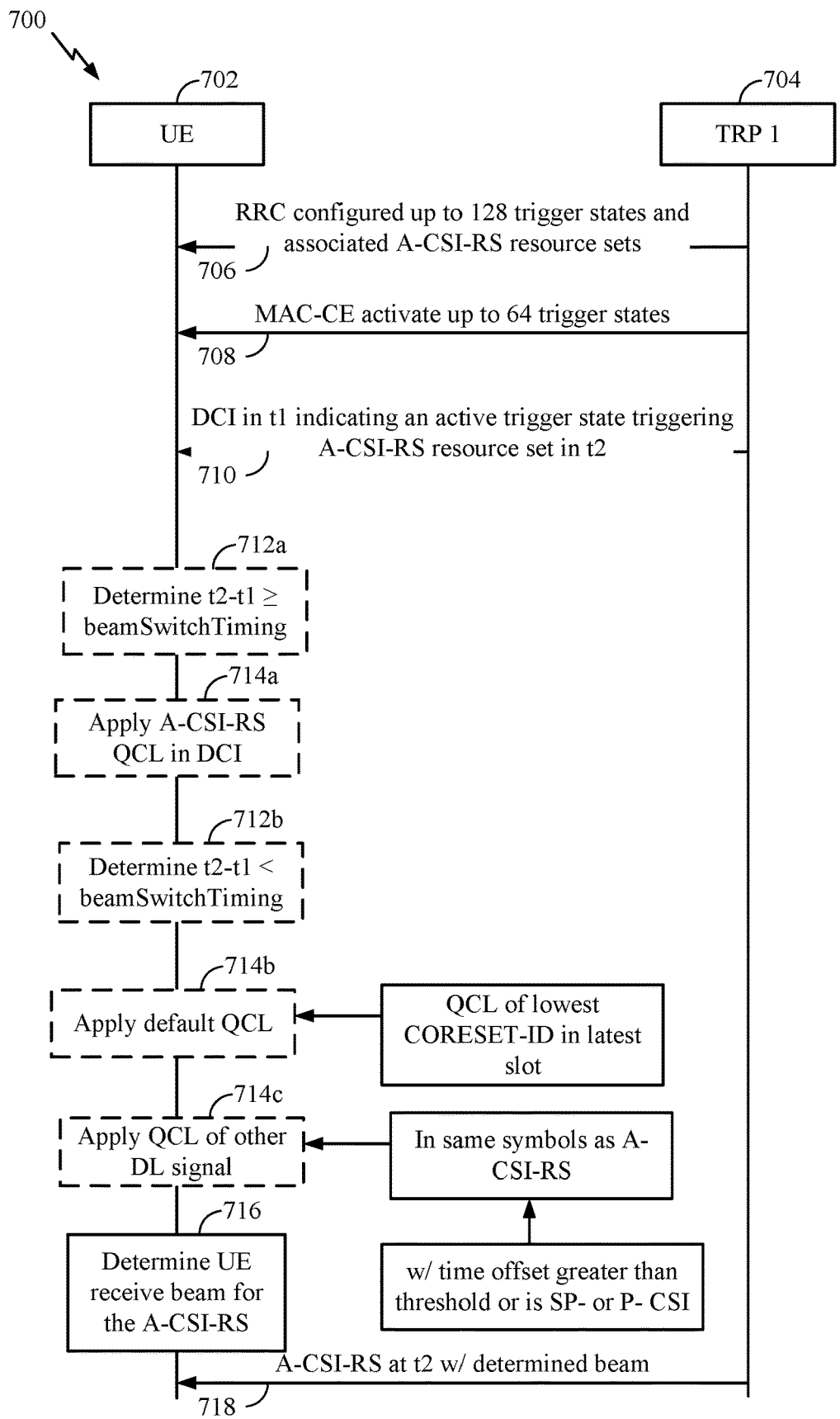
FIG. 7A is a call flow diagram illustrating example signaling for a single-TRP aperiodic channel state information (A-CSI) reference signal (RS) QCL assumption, in accordance with certain aspects of the present disclosure.

FIG. 7A is a call flow diagram illustrating example signaling 700 for a single-transmission reception point (TRP) aperiodic channel state information (A-CSI) reference signal (RS) quasi-colocation (QCL) assumption for certain wireless systems (e.g., Release 15 systems).

Figure 7B:
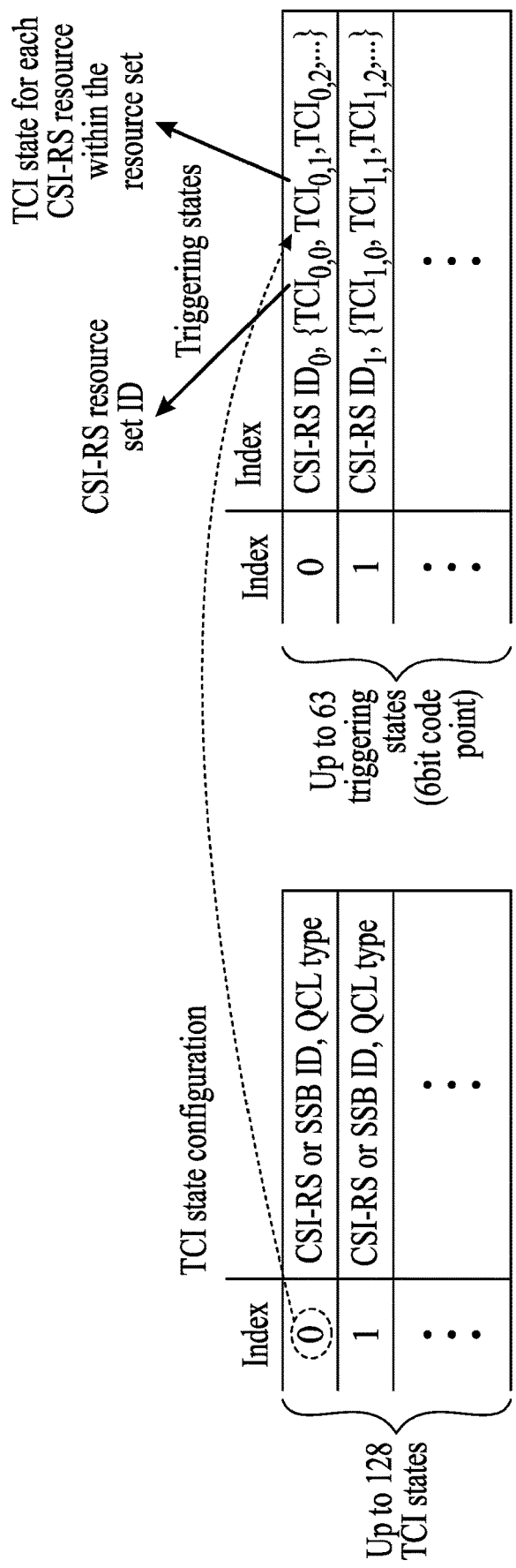
FIG. 7B is an example mapping of TCI state configurations to trigger states, in accordance with certain aspects of the present disclosure.

For A-CSI, downlink control information (DCI) may trigger a channel state information (CSI) report. For example, the DCI with an uplink grant may trigger an A-CSI report on a physical uplink shared channel (PUSCH). As shown in FIG. 7A, at 706, a radio resource control (RRC) configured CSI reporting configuration may configure a user equipment (UE) 702 with up to 128 trigger states (e.g., a higher layer parameter AperiodicTriggerStateList). As shown in FIG. 7B, each trigger state in a list is linked to a CSI-RS resource set, each CSI-RS resource set has multiple CSI-RS resources, and a transmission configuration indicator (TCI) state for each of the CSI-RS resources is indicated as part of trigger state configuration. At 708, a medium access control (MAC) control element (CE) may activate up to 64 of the configured trigger states.

At 710, the UE 702 receives a DCI (with a last symbol of the DCI at t1) from the BS 704 triggering an A-CSI-RS (with a first symbol of the A-CSI-RS at t2). The DCI may indicate one of the active trigger states. For example, a field (e.g., CSI request field) may use N bits, for $2^N-1$ trigger states activated through MAC-CE (e.g., mapping to the maximum of 64 codepoints for N=6) to indicate one TCI state (e.g., all 0 means no CSI report triggered).

It takes time for the UE 702 to switch its beam to receive the A-CSI-RS (e.g., to the beam indicated by the TCI associated with the CSI-RS resource set triggered by the DCI). The UE 702 may apply the indicated TCI state or a default QCL assumption, based on whether a time duration between the A-CSI-RS and the DCI satisfies a threshold. For example, the threshold may be a "beamSwitchTiming" threshold. The UE 702 may report the threshold to a TRP 1 associated with a base station (BS) 704 as a UE capability.

As shown in FIG. 7A, if the UE 702 determines, at 712a, a time offset between a reception of the DCI and a corresponding A-CSI-RS is equal to or larger than the threshold (e.g., beamSwitchTiming), then the UE 702 may apply the TCI state indicated in the DCI for the A-CSI-RS, at 714a. For example, the UE 702 can determine the receive beam for receiving the A-CSI-RS based on the indicated TCI state at 716.

If the UE 702 determines, at 712b, that the time offset is less than the threshold (e.g., beamSwitchTiming), and the UE 702 determines there are no other downlink (DL) signals in the same symbol(s) as the A-CSI-RS, then the UE 702 applies a default QCL assumption for the A-CSI-RS, at 714b. For example, the UE 702 can determine the receive beam for receiving the A-CSI-RS based on the default QCL, at 716. For example, the default QCL assumption may be the QCL of a lowest CORESET-ID in a latest slot in which the UE 702 monitors control resource sets (CORESETs) within an active bandwidth part (BWP) of the serving cell.

If there are other DL signals in the same symbols as the A-CSI-RS, then the UE 702 applies the QCL assumption of the other DL signals if the other signal has an indicated TCI state. For example, the other DL signal may be a physical downlink shared channel (PDSCH) with an offset larger than or equal to the threshold timeDurationForQCL. The other DL signal may be another A-CSI-RS with an offset larger than or equal to the threshold BeamSwitchTiming. The other DL signal may be a periodic CSI-RS or a semi-persistent CSI-RS.

Stated otherwise, for each A-CSI resource in a CSI-RS resource set associated with a CSI triggering state, the UE 702 is indicated the QCL configuration of the RS source and QCL type (higher layer signaling qcl-info), which contains a list of references to TCI-States for the A-CSI-RS resources associated with the trigger state: if a state in the list is configured with reference to an RS associated with QCL-TypeD that RS may be an synchronization signals (SS)/ physical broadcast channel (PBCH) block located in a same or different CC/DL BWP or a CSI-RS resource configured as a periodic or a semi-persistent in a same or a different CC/DL BWP. If an scheduling offset between a last symbol of a physical downlink control channel (PDCCH) carrying the trigger DCI and a first symbol of the A CSI-RS resource in a NZP-CSI-RS-ResourceSet configured without higher layer parameter trs-Info and without the higher layer parameter repetition is smaller than the UE 702 reported threshold beamSwitchTiming when the reported values is {14,28,28}, if there is any other DL signal with an indicated TCI state in the same symbols as the CSI-RS, the UE 702 applies the QCL assumption of the other DL signal also when receiving the aperiodic CSI-RS. The other DL signal refers to a PDSCH scheduled with an offset larger than or equal to the threshold timeDurationForQCL, aperiodic CSI-RS scheduled with offset larger than or equal to the UE reported threshold beamSwitchTiming when the reported value is one of the values {14,28,48}, periodic CSI-RS, semi-persistent CSI-RS. Else, when receiving the aperiodic CSI-RS, the UE 702 applies the QCL assumption used for the CORESET associated with a monitored search space with the lowest CORESET-ID in the latest slot in which one or more CORESETs within the active BWP of the serving cell are monitored.

At 718, the UE 702 receives the A-CSI-RS (at t2) from the BS using the determined received beam.

In certain systems, A-CSI reporting may be configured and associated with A-CSI-RS resource sets. In some examples, the A-CSI reporting is configured with mTRP. What is needed are techniques for determining the QCL assumption for the A-CSI-RS, for example, in cases where the UE supports simultaneous reception with two beams and two default QCL assumptions.

Example QCL Assumption for A-CSI-RS Configured with mTRP

Aspects of the present disclosure provide apparatus, methods, processing systems, and computer readable mediums for quasi-colocation (QCL) assumption for aperiodic channel state information (CSI) reference signal (RS) configured with multiple transmission reception point (mTRP).

Figure 8:
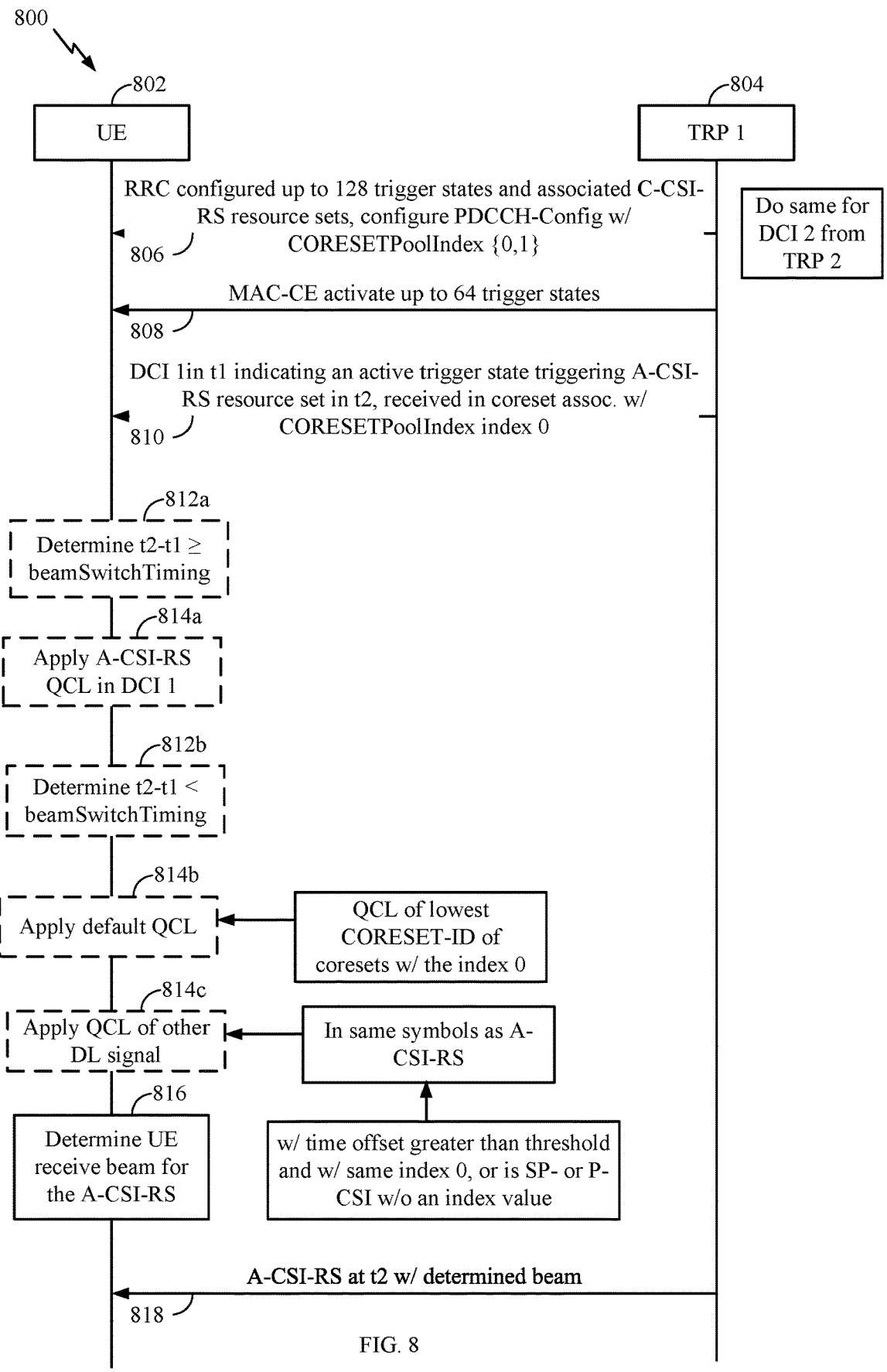
FIG. 8 is a call flow diagram illustrating example signaling for a multi-DCI mTRP A-CSI-RS QCL assumption, in accordance with certain aspects of the present disclosure.

FIG. 8 is a call flow diagram illustrating example signaling 800 for a multiple downlink control information (mDCI) multiple transmission reception point (mTRP) A-CSI-RS QCL assumption, in accordance with certain aspects of the present disclosure. A user equipment (UE) 802 may be capable of two simultaneous beam reception and two default QCL assumptions.

For A-CSI, DCI may trigger a CSI report. For example, the DCI with an uplink (UL) grant may trigger the A-CSI report on a physical uplink shared channel (PUSCH). As shown in FIG. 8, at 806 the UE 802 may be configured (e.g., via radio resource control (RRC) signaling received from a TRP 1 804 associated with a base station (BS)) with a set (e.g., up to 128) of trigger states. For example, the UE 802 may be configured with the set of trigger states in a CSI reporting configuration. As shown in FIG. 8, each trigger state in a list may be linked to a CSI-RS resource set. Each CSI-RS resource set may have multiple CSI-RS resources. A transmission configuration indicator (TCI) state for each of the CSI-RS resources may be indicated as part of trigger state configuration. At 808, a medium access control (MAC) control element (CE) may activate a subset (e.g., up to 64) of the configured trigger states.

The UE 802 may be scheduled for an mDCI mTRP transmission. For example, the UE 802 may be configured by a higher layer parameter (e.g., PDCCH-Config) that contains two different index values (e.g., CORESETPoolIndex) in two different CORESETs. As shown in FIG. 8, at 806, the UE 802 may also receive a configuration (e.g., the PDCCH-config RRC parameter) with index values (e.g., CORESETPoolIndex values) from the TRP 1 804 (or TRP 2 or both). The configuration of the trigger states and index values may be done separately and/or at different times. As discussed above, each control resource set (CORESET) may be configured with an index value. In some example, the index values are a 0 or 1. Thus, the CORESETS may be separated into two groups (e.g., a group of CORESETS associated with the CORESETPoolIndex value 0 and a group of CORESETS associated with the CORESETPoolIndex value 1).

At 810, the UE 802 may receive a DCI (at t1) from the BS triggering A-CSI-RS (at t2). The DCI may indicate one of the active trigger states. It takes time for the UE 802 to switch its beam to receive the A-CSI-RS (e.g., to the beam indicated by the TCI state associated with the CSI-RS resource set triggered by the DCI). The UE 802 may apply the indicated TCI state or a default QCL assumption, based on whether a time duration between the A-CSI-RS and the DCI satisfies a threshold. For example, the threshold may be a "beamSwitchTiming" threshold. The UE 802 may report the threshold to the BS as a UE capability.

As shown in FIG. 8, the DCI, received at 810, may indicate a TCI state for the scheduled A-CSI-RS. The DCI may be received in a CORESET associated with one of the index values (e.g., index value 0 in the example in FIG. 8). Thus, the UE 802 identifies the CORESET and index value associated with the DCI. The index value of the CORESET in which the DCI is received may be used for different purposes, such as hybrid automatic repeated request (HARQ)-Ack codebook construction and transmission, physical downlink shared channel (PDSCH) scrambling, and the like.

As shown in FIG. 8, if the UE 802 determines, at 812a, a time offset between a reception of the DCI and a corresponding A-CSI-RS is equal to or larger than the threshold (e.g., beamSwitchTiming), then the UE 802 may apply the TCI state indicated in the DCI for the A-CSI-RS, at 814a. For example, the UE 802 can determine the receive beam for receiving the A-CSI-RS based on the indicated TCI state, at 816.

If the scheduling offset between the DCI that triggers the A-CSI report and the indicated A-CSI-RS resource set is less than the threshold (e.g., the UE reported threshold beamSwitchTiming) then the UE 802 may apply the QCL assumption based on a default QCL assumption or based on the QCL of another downlink (DL) signal.

According to certain aspects, the UE 802 may determine to use a default QCL assumption when there are no other DL signals in same symbol(s) as the triggered A-CSI-RS. As shown in FIG. 8, if the UE 802 determines, at 812b, that the time offset is less than the threshold (e.g., beamSwitchTiming), then the UE 802 applies a default QCL assumption for the A-CSI-RS at 814b. For example, the UE 802 can determine the receive beam for receiving the A-CSI-RS based on the default QCL, at 816. The default QCL assumption may be the QCL assumption of a lowest CORESET-ID from among the CORESETS associated with the same index value as the DCI, in the latest slot in which the CORESETs are monitored within an active bandwidth part (BWP) of the serving cell.

According to certain aspects, the UE 802 may determine to use a QCL assumption of another DL signals in the same symbol(s) as the triggered A-CSI-RS. As shown in FIG. 8, if the UE 802 determines, at 812b, that the time offset is less than the threshold (e.g., beamSwitchTiming), then the UE 802 applies a QCL assumption of another DL signal for the A-CSI-RS at 814c.

In some examples, the UE 802 applies the QCL assumption of another DL signal in the same symbol(s) as the triggered A-CSI-RS that has an indicated TCI state. For example, the UE 802 may determine the index value of the CORSET in which the DCI triggering the AP CSI is received. If the index value is the same as the index value associated with the index value associated with the triggered A-CSI-RS, then the UE 802 may use the QCL assumption of the DL signal.

In some examples, the UE 802 applies the QCL assumption of the other DL signal with the same index value when the other DL signal is scheduled at an offset equal to or larger than a threshold. For example, the other DL signal may be a PDSCH (scheduled in the same symbol(s) and with the same index value as the triggered A-CSI-RS) with an offset, from the DCI scheduling the PDSCH, that is equal to or larger than a threshold (e.g., the timeDurationForQCL threshold). The other DL signal may be another A-CSI-RS (scheduled in the same symbol(s) and with the same index value as the triggered A-CSI-RS) with an offset, from the DCI triggering the other A-CSI-RS, that is equal to or larger than a threshold (e.g., the beamSwitchTiming threshold). In some examples, the other DL signal is a physical downlink control channel (PDCCH) received in a CORESET associated with the same index value and in the same symbol(s) as the A-CSI-RS.

In some examples, the UE 802 applies the QCL assumption of another DL signal in the same symbol(s) as the triggered A-CSI-RS that is not associated with an index value. For example, the other DL signal may be a semi-persistent CSI-RS or a persistent CSI-RS in the same symbol(s) as the A-CSI-RS.

In some examples, if there are multiple other DL signals in the same symbol(s) as the A-CSI-RS, the UE 802 applies the QCL assumption of the DL signal associated with a lowest CSI-RS resource ID.

In some examples, if there are multiple other DL signals in the same symbol(s) as the A-CSI-RS, the UE 802 applies the default QCL assumption. For example, the UE 802 may apply the QCL assumption of the lowest CORESET-ID from among the CORESETS associated with the same index value as the DCI, in the latest slot in which the CORESETs are monitored within an active BWP of the serving cell.

In some examples, if there are multiple other DL signals in the same symbol(s) as the A-CSI-RS, the UE 802 applies the QCL assumption of the DL signal associated with a lowest CSI-RS resource ID when the at least two different QCL assumption are used for reception of the other DL signals.

At 818, the UE 802 receives the A-CSI-RS (at t2) from the TRP 1 804 using the determined received beam.

Figure 9:
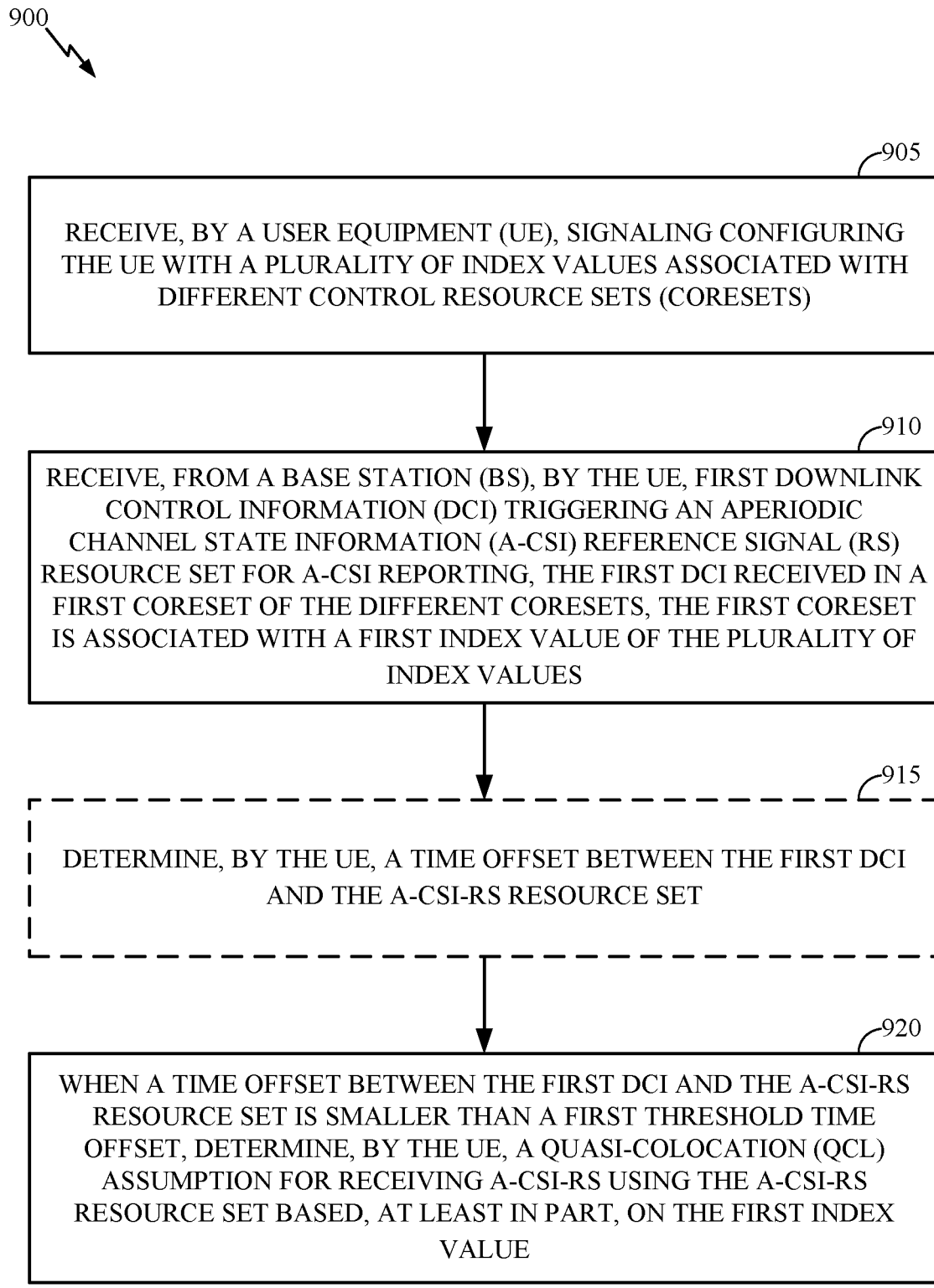
FIG. 9 is a flow diagram illustrating example operations for wireless communication by a UE, in accordance with certain aspects of the present disclosure.

FIG. 9 is a flow diagram illustrating example operations 900 for wireless communication by a UE for a QCL assumption for A-CSI-RS with mDCI mTRP, in accordance with certain aspects of the present disclosure. The UE may support concurrent reception of multiple beams and multiple default QCL assumptions for multiple-DCI mTRP communication. The operations 900 may be performed, for example, by the UE (e.g., such as a UE 120*a* in the wireless communication network 100 of FIG. 1). The operations 900 may be implemented as software components that are executed and run on one or more processors (e.g., the controller/processor 280 of FIG. 2). Further, transmission and reception of signals by the UE in operations 900 and/or 1200 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280 of FIG. 2) obtaining and/or outputting signals.

The operations 900 may begin, at 905, by receiving signaling configuring the UE with a plurality of index values associated with different CORESETS.

In some examples, the signaling is higher layer signaling configuring the UE with a first CORESET pool index value associated with a first plurality of CORESETs and a second CORESET pool index value associated with a second plurality of CORESETs.

At 910, the UE receives, from a BS, first DCI triggering an A-CSI-RS resource set for A-CSI reporting. The first DCI received in a first CORESET of the different CORESETs. The first CORESET is associated with a first index value of the plurality of index values;

At 920, when a first time offset between the first DCI and the A-CSI-RS resource set is smaller than a first threshold time offset, the UE determines a QCL assumption for receiving A-CSI-RS using the A-CSI-RS resource set based, at least in part, on the first index value. For example, at 915, the UE may determine a time offset between the first DCI and the A-CSI-RS resource set.

In some examples, the first threshold time offset is a beam switching timing parameter reported to the BS as a capability of the UE.

In some examples, determining the QCL assumption for receiving the A-CSI-RS includes identifying whether one or more DL signals are in a same one or more symbols as the A-CSI-RS and identifying whether the one or more DL signals are associated with the first index value.

In some examples, when the UE identifies the one or more DL signals in the same one or more symbols as the A-CSI-RS and associated with the first index value, the UE determines the QCL assumption for receiving the A-CSI-RS as a QCL assumption for one of the one or more DL signals. In some examples, the one or more DL signals include one or more PDSCHs scheduled by one or more second DCI received in a CORESET associated with the first index value with a time offset between the one or more second DCI and the one or more PDSCHs is equal to or larger than a second threshold time offset, one or more second A-CSI-RSs scheduled by one or more second DCI received in a CORESET associated with the first index value with a time offset between the one or more second DCI and the one or more A-CSI-RSs is equal to or larger than the first threshold time offset, or one or more PDCCHs received in a CORESET associated with the first index value.

In some examples, when the UE identifies one or more DL signals in the same one or more symbols as the A-CSI-RS and are not associated with an index value, the UE determines the QCL assumption for receiving the A-CSI-RS as a QCL assumption for one of the one or more DL signals. In some examples, the one or more DL signals are one or more of semi-persistent CSI-RS or periodic CSI-RS. In some examples, the QCL assumption is the QCL assumption or the DL signal associated with a lowest CSI-RS resource ID. In some examples, the one or more DL signals are associated with different QCL assumptions.

In some examples, when the UE identifies one or more DL signals in the same one or more symbols as the A-CSI-RS and are not associated with an index value, the UE determines the QCL assumption for receiving the A-CSI-RS as a default QCL assumption associated with the first index value. In some examples, the default QCL is a QCL associated with a lowest CORESET ID of CORESETs associated with the first index value in a latest slot and within an active BWP of a serving cell. In some examples, the one or more DL signals are associated with a same QCL.

In some examples, when the UE identifies no second DL signal in the same one or more symbols as the A-CSI-RS associated with the first TCI state, the UE determines the QCL assumption for receiving the A-CSI-RS as a default QCL assumption associated with the first index value. In some examples, the default QCL assumption is a QCL assumption associated with a lowest CORESET ID of CORESETs associated with the first index value in a latest slot and within an active BWP of a serving cell.

In some examples, the UE determines to apply a QCL assumption indicated in the first DCI when the time offset is equal or greater than the first threshold time offset.

In some examples, the UE determines a receive beam to use for receiving the A-CSI-RS based on the determined QCL assumption. In some examples, the UE receives a CSI reporting configuration configuring the UE with one or more A-CSI-RS resource sets including the A-CSI-RS resource set. Each A-CSI-RS resource set includes a plurality of A-CSI-RS resources. Each A-CSI-RS resource is associated with a TCI state. In some examples, the UE measures the A-CSI RS and sends the BS an A-CSI report based on the measurements.

Figure 10:
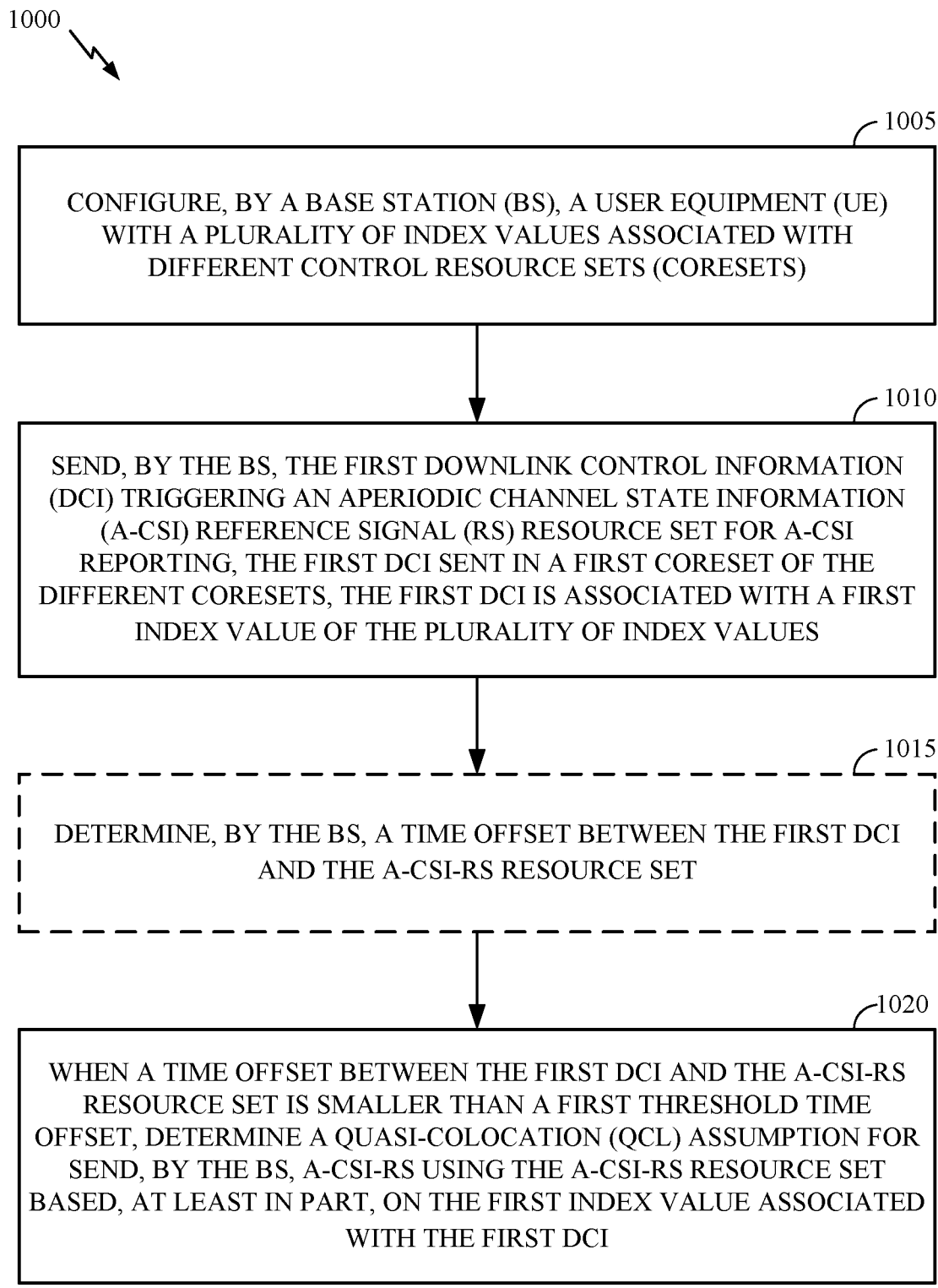
FIG. 10 is a flow diagram illustrating example operations for wireless communication by a BS, in accordance with certain aspects of the present disclosure.

FIG. 10 is a flow diagram illustrating example operations 1000 for wireless communication by a BS for a QCL assumption for A-CSI-RS with mDCI mTRP, in accordance with certain aspects of the present disclosure. The operations 1000 may be performed, for example, by the BS (e.g., such as the BS 110*a* in the wireless communication network 100 of FIG. 1). The operations 1000 may be implemented as software components that are executed and run on one or more processors (e.g., the controller/processor 240 of FIG. 2). Further, transmission and reception of signals by the BS in operations 1000 may be enabled, for example, by one or more antennas (e.g., the antennas 234 of FIG. 2). In certain aspects, the transmission and/or reception of signals by the BS may be implemented via a bus interface of one or more processors (e.g., the controller/processor 240 of FIG. 2) obtaining and/or outputting signals.

The operations 1000 may begin, at 1005, by configuring a UE with a plurality of index values associated with different CORESETS.

At 1010, the BS sends the UE first DCI triggering an A-CSI-RS resource set for A-CSI reporting. The first DCI sent in a first CORESET of the different CORESETs. The first DCI is associated with a first index value of the plurality of index values.

At 1020, when a time offset between the first DCI and the A-CSI-RS resource set is smaller than a first threshold time offset, the BS determines a QCL assumption for sending A-CSI-RS using the A-CSI-RS resource set based, at least in part, on the first index value associated with the first DCI. For example, at 1015, the BS may determine a time offset between the first DCI and the A-CSI-RS resource set.

Figure 11:
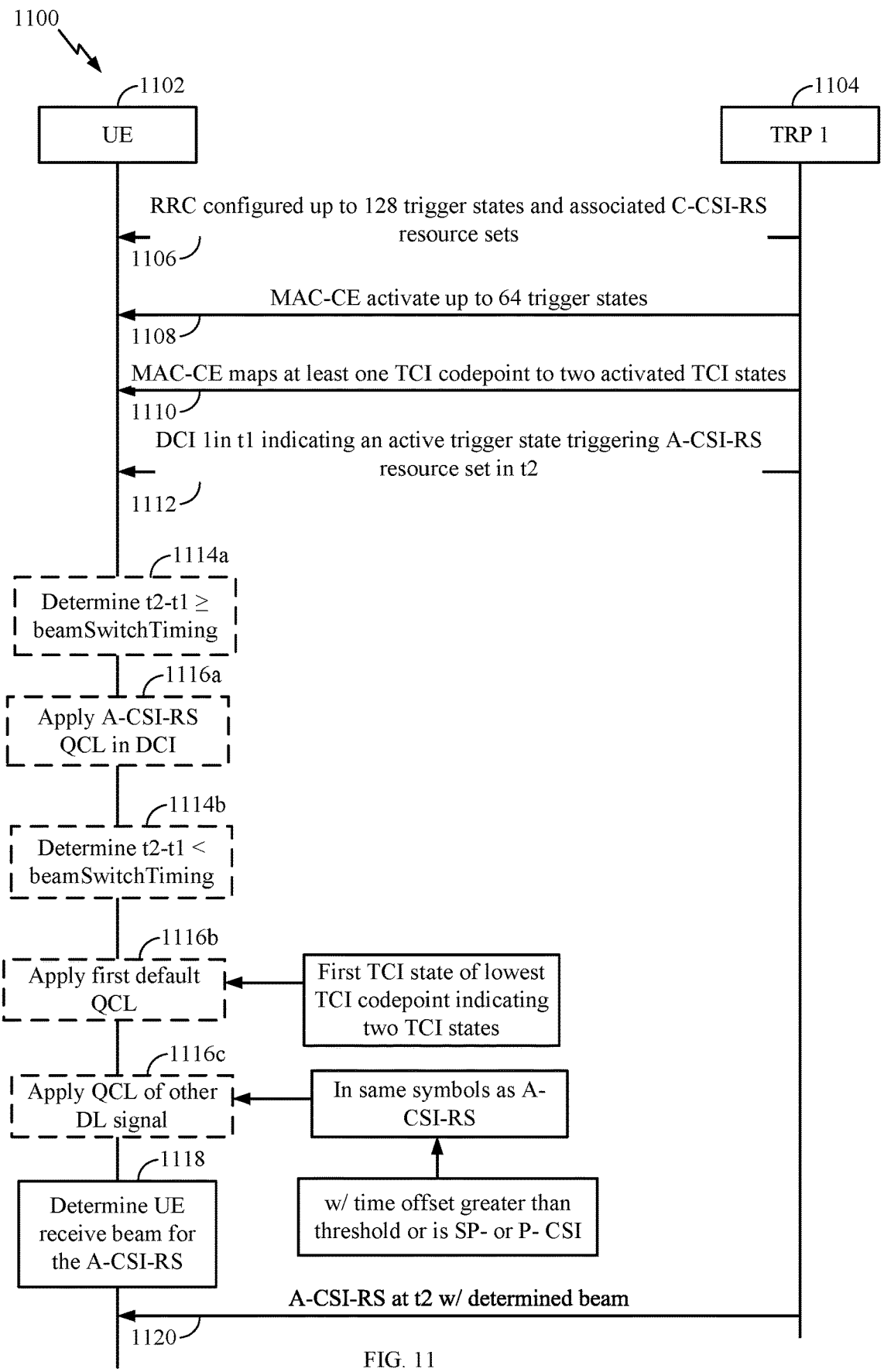
FIG. 11 is a call flow diagram illustrating example signaling for a single-DCI mTRP A-CSI-RS QCL assumption, in accordance with certain aspects of the present disclosure.

FIG. 11 is a call flow diagram illustrating example signaling 1100 for a single-DCI mTRP A-CSI-RS QCL assumption, in accordance with certain aspects of the present disclosure. A UE 1102 may be capable of two simultaneous beam reception and two default QCL assumptions.

As discussed above, for A-CSI, a DCI may trigger a CSI report. For example, the DCI with an UL grant may trigger the A-CSI report on a PUSCH. As shown in FIG. 11, at 1106 the UE 1102 may be configured (e.g., via RRC signaling) with a set (e.g., up to 128) of trigger states. For example, the UE 1102 may be configured with the set of trigger states in a CSI reporting configuration. As shown in FIG. 11, each trigger state in the list may be linked to a CSI-RS resource set. Each CSI-RS resource set may have multiple CSI-RS resources. A TCI state for each of the CSI-RS resources may be indicated as part of trigger state configuration. At 1108, a MAC-CE may activate a subset (e.g., up to 64) of the configured trigger states.

The UE 1102 may be scheduled for a single-DCI mTRP transmission. As shown in FIG. 11, the UE 1102 receives a MAC-CE, at 1110, that maps at least one TCI codepoint to two activated TCI states. At 1112, the UE 1102 may receive a DCI (at t1) from a TRP 1104 associated with a BS triggering A-CSI-RS (at t2) (e.g., and triggering the A-CSI report on PUSCH). The DCI may indicate one of the active trigger states. For example, the DCI may indicate a TCI codepoint, which may be mapped to one or more two TCI states.

It takes time for the UE 1102 to switch its beam to receive the A-CSI-RS (e.g., to the beam indicated by the TCI state in the DCI). The UE 1102 may apply the indicated TCI state or a default QCL assumption, based on whether a time duration between the A-CSI-RS and the DCI satisfies a threshold. For example, the threshold may be a "beam-SwitchTiming" threshold. The UE 1102 may report the threshold to the BS as a UE capability.

As shown in FIG. 11, if the UE 1102 determines, at 1114*a*, the time offset between the reception of the DCI and the corresponding A-CSI-RS is equal to or larger than the threshold (e.g., beamSwitchTiming), then the UE 1102 may apply the TCI state indicated in the DCI for the A-CSI-RS, at 1116*a*. For example, the UE 1102 can determine the receive beam for receiving the A-CSI-RS based on the indicated TCI state, at 1118.

If the scheduling offset between the DCI that triggers the A-CSI report and the indicated A-CSI-RS resource set is less than the UE threshold (e.g., the UE reported threshold beamSwitchTiming) then the UE 1102 may apply the QCL assumption based on a default QCL assumption or based on the QCL of another DL signal.

According to certain aspects, the UE 1102 may determine to use a default QCL assumption when there are no other DL signals in the same symbol(s) as the triggered A-CSI-RS. As shown in FIG. 11, if the UE 1102 determines, at 1114*b*, that the time offset is less than the threshold (e.g., beamSwitch-Timing), then the UE 1102 applies a first default QCL assumption for the A-CSI-RS at 1116*b*. For example, the UE 1102 can determine the receive beam for receiving the A-CSI-RS based on the first default QCL at 1118. The first default QCL assumption may be the first TCI state of the lowest TCI codepoint of the TCI codepoints indicating two TCI states.

According to certain aspects, the UE 1102 may determine to use a QCL assumption of another DL signals in the same symbol(s) as the triggered A-CSI-RS. As shown in FIG. 11, if the UE 1102 determines, at 1114*b*, that the time offset is less than the threshold (e.g., beamSwitchTiming), then the UE 802 applies a QCL assumption of another DL signal for the A-CSI-RS, at 1116*c*.

In some examples, the other DL signal may be a PDSCH scheduled with an offset (e.g., from the DCI scheduling the PDSCH to the PDSCH) larger than or equal to a threshold (e.g., the timeDurationForQCL threshold). In some examples, if the PDSCH has two TCI states (e.g., the TCI field/codepoint of the DCI scheduling PDSCH indicates two TCI states), then UE 1102 may determine the first indicated TCI state of the two TCI states as the QCL assumption for reception of the A-CSI-RS.

In some examples, the other DL signal may be another A-CSI-RS, with scheduling offset (e.g., from a DCI triggering the other A-CSI-RS to the A-CSI-RS) larger than or equal to the threshold (e.g., the beamSwitchTiming threshold).

In some examples, the other DL signal may be periodic CSI-RS or a semi-persistent CSI-RS.

According to certain aspects, there may be multiple other DL signals in the same symbol(s) as the triggered A-CSI-RS. The multiple other DL signals may have different QCL assumptions. In some examples, the UE 1102 follows the QCL assumption of a PDSCH (if any), the UE 1102 follows the QCL assumption of another A-CSI-RS (if any), or follows the QCL assumption of a periodic or semi-persistent CSI-RS. For example, the UE 1102 may be configured with a rule or a priority of which type of signal to use the QCL assumption for when different types of signals are present in the same symbol(s) as the A-CSI-RS. In some examples, if there are multiple periodic or semi-persistent CSI-RS in the same symbol(s) as the triggered A-CSI-RS, the UE 1102 may follow the QCL assumption of the periodic or semi-persistent CSI-RS associated with the lowest CSI-RS resource ID.

At 1120, the UE 1102 receives the A-CSI-RS (at t2) from the TRP 1 1104 using the determined received beam.

Figure 12:
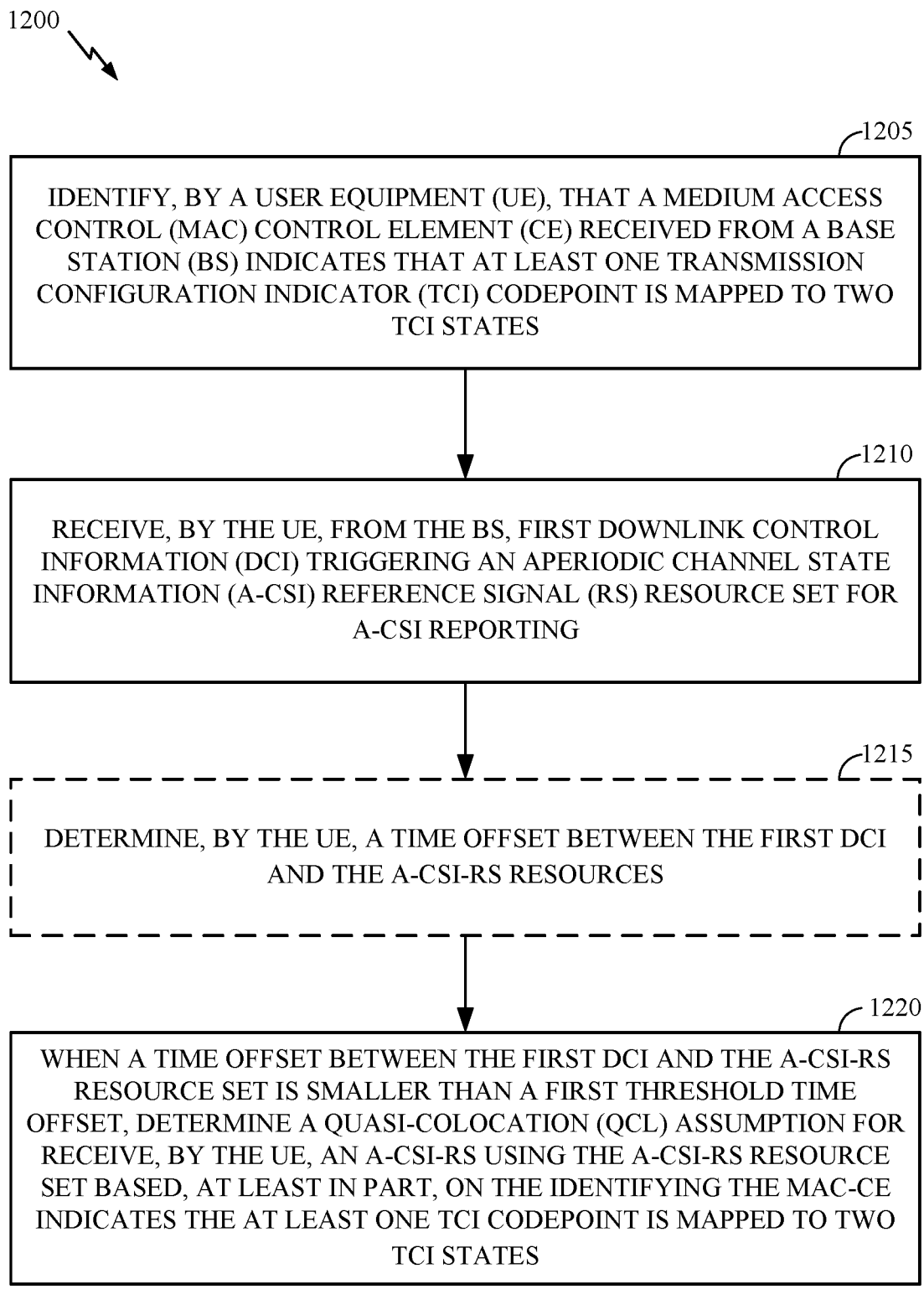
FIG. 12 is a flow diagram illustrating example operations for wireless communication by a UE, in accordance with certain aspects of the present disclosure.

FIG. 12 is a flow diagram illustrating example operations 1200 for wireless communication by a UE for a single-DCI mTRP A-CSI-RS QCL assumption, in accordance with certain aspects of the present disclosure. The UE may support concurrent reception of multiple beams and multiple default QCLs for a single-DCI mTRP communication. The multiple TRPs transmit with SDM, FDM, and/or TDM. The operations 1200 may be performed, for example, by the UE (e.g., such as a UE 120a in the wireless communication network 100 of FIG. 1). The operations 1200 may be implemented as software components that are executed and run on one or more processors (e.g., the controller/processor 280 of FIG. 2). Further, transmission and reception of signals by the UE in operations 900 and/or 1200 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280 of FIG. 2) obtaining and/or outputting signals.

The operations 1200 may begin, at 1205, by identifying that a MAC-CE received from a BS indicates that at least one TCI codepoint is mapped to two TCI states. In some examples, the UE receives RRC signaling configuring a plurality of TCI states. The MAC-CE may activate a subset of the plurality of TCI states for PDSCH reception. The MAC-CE may map a plurality of TCI codepoints to one or more TCI states. At least one TCI codepoint is mapped to more than one TCI state. A DL DCI indicates a TCI codepoint.

At 1210, the UE receives, from the BS, first DCI triggering an A-CSI-RS resource set for A-CSI reporting.

At 1220, when a time offset between the first DCI and the A-CSI-RS resource set is smaller than a first threshold time offset, the UE determines a QCL assumption for receiving an A-CSI-RS using the A-CSI-RS resource set based, at least in part, on the identifying the MAC-CE indicates the at least one TCI codepoint is mapped to two TCI states. For example, at 1215, the UE may determine a time offset between the first DCI and the A-CSI-RS resources.

In some examples, the first threshold time offset is a beam switching timing parameter reported to the BS as a capability of the UE.

In some examples, determining the QCL assumption for receiving the A-CSI-RS includes identifying whether one or more DL signals are in a same one or more symbols as the A-CSI-RS; and identifying whether the one or more DL signals are associated with a same TCI state.

In some examples, the one or more DL signals comprise one or more of one or more PDSCHs scheduled by one or more second DCI with a time offset between the one or more second DCI and the one or more PDSCHs is equal to or larger than the threshold, one or more second A-CSI-RSs scheduled by one or more second DCI with a time offset between the one or more second DCI and the one or more A-CSI-RSs equal to or larger than the threshold, one or more semi-persistent A-CSI, and one or more periodic A-CSI.

In some examples, when the UE identifies a DL signal in the same one or more symbols as the A-CSI-RS and scheduled by a second DCI with a time offset between the second DCI and the DL signal, and the second DCI indicates two TCI states, the UE determines the first indicated TCI state of two TCI states as the QCL assumption for receiving the A-CSI-RS. The DL signal is a PDSCH with the two TCI states indicated by the second DCI.

In some examples, when the UE identifies one or more DL signals in the same one or more symbols as the A-CSI-RS and indicates the same TCI states, the UE determines the QCL assumption for receiving the A-CSI-RS as a QCL assumption for the DL signal.

In some examples, when the UE identifies multiple DL signals in the same one or more symbols as the A-CSI-RS, where the multiple DL signals are not received with the same TCI state, the UE determines the QCL assumption for receiving the A-CSI-RS as the QCL assumption for a PDSCH when the multiple DL signals includes a PDSCH; the UE determines the QCL assumption for receiving the A-CSI-RS as the QCL assumption for another A-CSI-RS when the multiple DL signals includes another A-CSI-RS; and the UE determines the QCL assumption for receiving the A-CSI-RS as the QCL assumption for a periodical or semi-persistent CSI-RS when the multiple DL signals includes a periodic or semi-persistent CSI-RS.

In some examples, determining the QCL assumption for receiving the A-CSI-RS includes determining the QCL assumption for receiving the A-CSI-RS as the QCL assumption for a periodic or semi-persistent CSI-RS having a lowest CSI-RS resource ID when the multiple DL signals includes multiple periodic or semi-persistent CSI-RS.

In some examples, when the UE identifies no other DL signal in the same one or more symbols as the A-CSI-RS and indicating the same TCI states, the UE determines the QCL assumption for receiving the A-CSI-RS as a default QCL assumption.

In some examples, the default QCL assumption is a QCL assumption associated with a first TCI state of a lowest TCI codepoint that indicates multiple TCI states.

In some examples, the UE determines to apply a QCL assumption indicated in the first DCI when the time offset is equal or greater than the threshold time offset.

In some examples, the UE determines a receive beam to use for receiving the A-CSI-RS based on the determined QCL assumption. In some examples, the UE receives a CSI reporting configuration configuring the UE with one or more A-CSI-RS resource sets including the A-CSI-RS resource set. Each A-CSI-RS resource set includes a plurality of A-CSI-RS resources. Each A-CSI-RS resource is associated with a TCI state. In some examples, the UE measures the A-CSI RS and sends the BS an A-CSI report based on the measurements.

Figure 13:
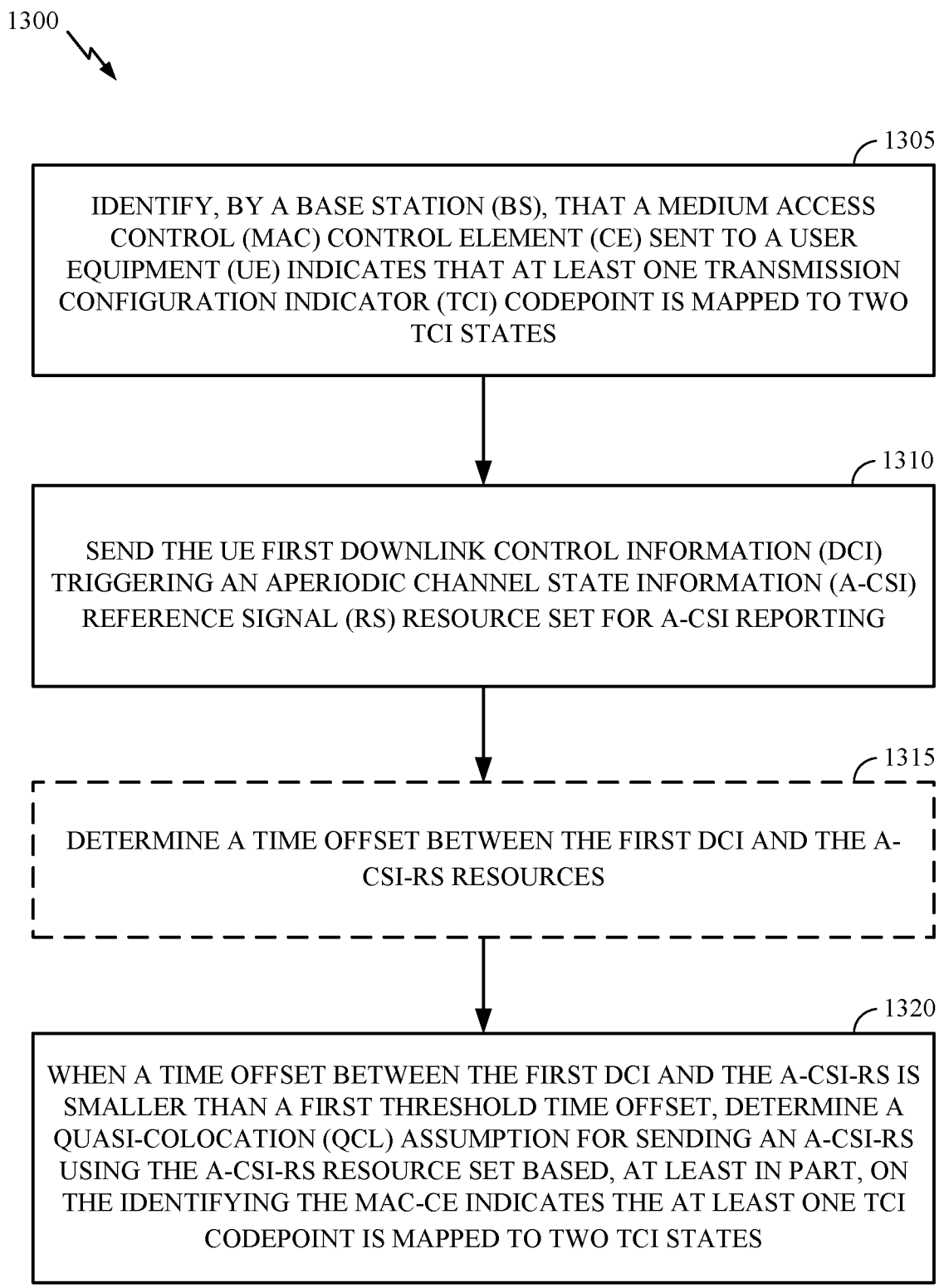
FIG. 13 is a flow diagram illustrating example operations for wireless communication by a BS, in accordance with certain aspects of the present disclosure.

FIG. 13 is a flow diagram illustrating example operations 1300 for a single-DCI mTRP A-CSI-RS QCL assumption, in accordance with certain aspects of the present disclosure. The operations 1300 may be performed, for example, by a BS (e.g., such as the BS 110a in the wireless communication network 100 of FIG. 1). The operations 1300 may be implemented as software components that are executed and run on one or more processors (e.g., the controller/processor 240 of FIG. 2). Further, transmission and reception of signals by the BS in operations 1300 may be enabled, for example, by one or more antennas (e.g., the antennas 234 of FIG. 2). In certain aspects, the transmission and/or reception of signals by the BS may be implemented via a bus interface of one or more processors (e.g., the controller/processor 240 of FIG. 2) obtaining and/or outputting signals.

The operations 1300 may begin, at 1305, by identifying that a MAC-CE sent to a UE indicates that at least one TCI codepoint is mapped to two TCI states.

At 1310, the BS sends the UE first DCI triggering an A-CSI-RS resource set for A-CSI reporting.

At 1320, when the first time offset is smaller than a first threshold time offset, determining a QCL assumption for sending an A-CSI-RS using the A-CSI-RS resource set based, at least in part, on the identifying the MAC-CE indicates the at least one TCI codepoint is mapped to two TCI states. For example, at 1315, the BS may determine a first time offset between the first DCI and the A-CSI-RS resources.

Figure 14:
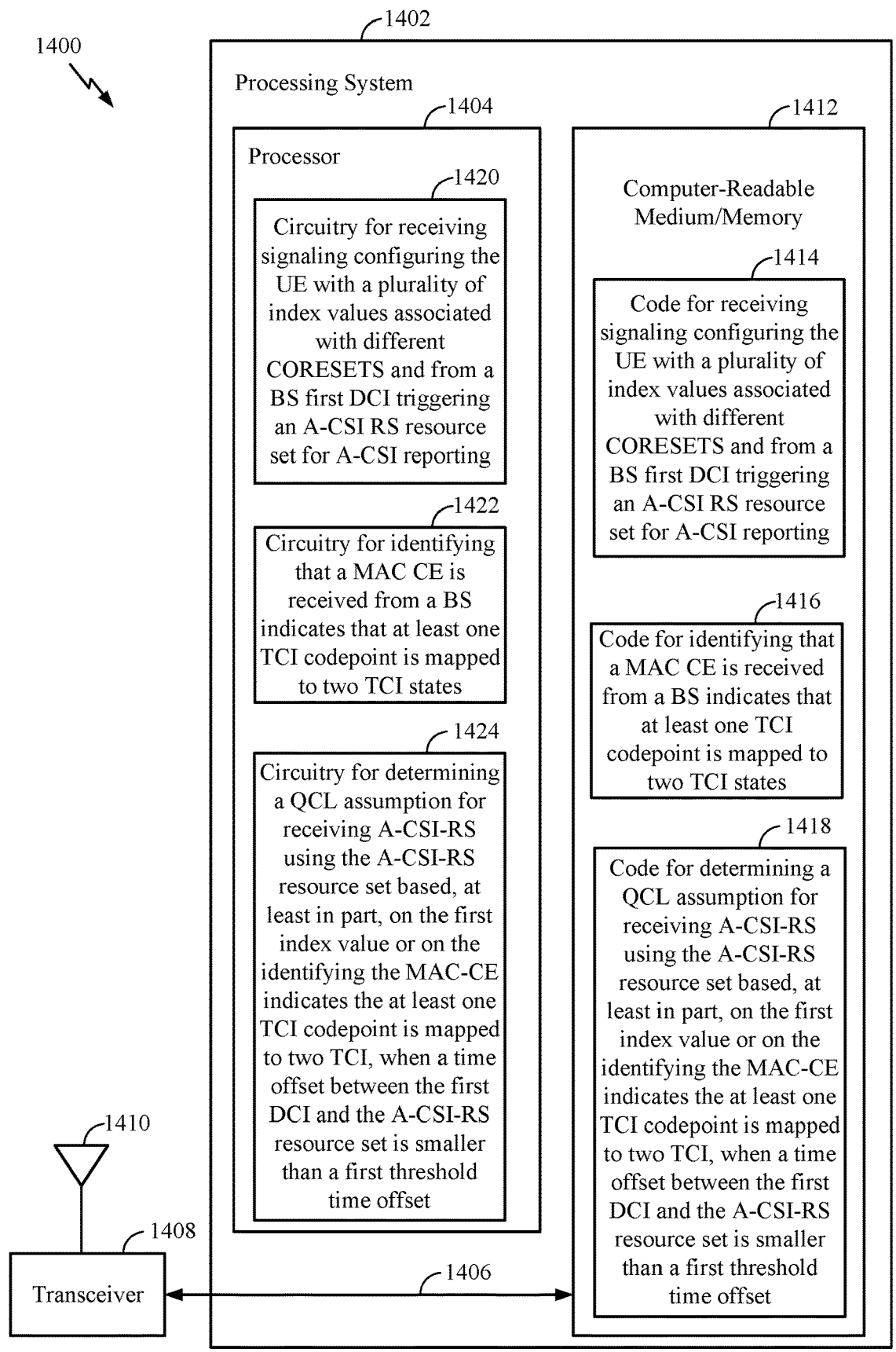
FIG. 14 illustrates a communications device that may include various components configured to perform operations for the techniques disclosed herein, in accordance with certain aspects of the present disclosure.

FIG. 14 illustrates a communications device 1400 that may include various components (e.g., corresponding to means-plus-function components) configured to perform operations for the techniques disclosed herein, such as the operations illustrated in FIG. 9 and/or FIG. 12. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 is configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., a computer-executable code) that when executed by the processor 1404, cause the processor 1404 to perform the operations illustrated in FIG. 9 and/or FIG. 12, or other operations for performing the various techniques discussed herein. In certain aspects, computer-readable medium/memory 1412 stores code 1414 for receiving, code 1416 for identifying, and code 1418 for determining. The code 1414 for receiving may include code for receiving signaling configuring the UE with a plurality of index values associated with different CORESETS, and from a BS first DCI triggering an A-CSI RS resource set for A-CSI reporting. The code 1416 for identifying may include code for identifying that a MAC CE is received from a BS indicates that at least one transmission configuration indicator (TCI) codepoint is mapped to two TCI states. The code 1418 for determining may include code for determining a QCL assumption for receiving A-CSI-RS using the A-CSI-RS resource set based, at least in part, on the first index value and/or the identifying the MAC-CE indicates the at least one TCI codepoint is mapped to two TCI states, when a time offset between the first DCI and the A-CSI-RS resource set is smaller than a first threshold time offset.

The processor 1404 may include circuitry configured to implement the code stored in the computer-readable medium/memory 1412, such as for performing the operations illustrated in FIG. 9 and/or FIG. 12, as well as other operations for performing the various techniques discussed herein. For example, the processor 1404 includes circuitry 1420 for receiving, circuitry 1422 for identifying, and circuitry 1424 for determining. The circuitry 1420 for receiving may include circuitry for receiving signaling configuring the UE with a plurality of index values associated with different CORESETS, and from a BS first DCI triggering an A-CSI RS resource set for A-CSI reporting. The circuitry 1422 for identifying may include circuitry for identifying that a MAC CE is received from a BS indicates that at least one transmission configuration indicator (TCI) codepoint is mapped to two TCI states. The circuitry 1424 for determining may include circuitry for determining a QCL assumption for receiving A-CSI-RS using the A-CSI-RS resource set based, at least in part, on the first index value and/or the identifying the MAC-CE indicates the at least one TCI codepoint is mapped to two TCI states, when a time offset between the first DCI and the A-CSI-RS resource set is smaller than a first threshold time offset.

Figure 15:
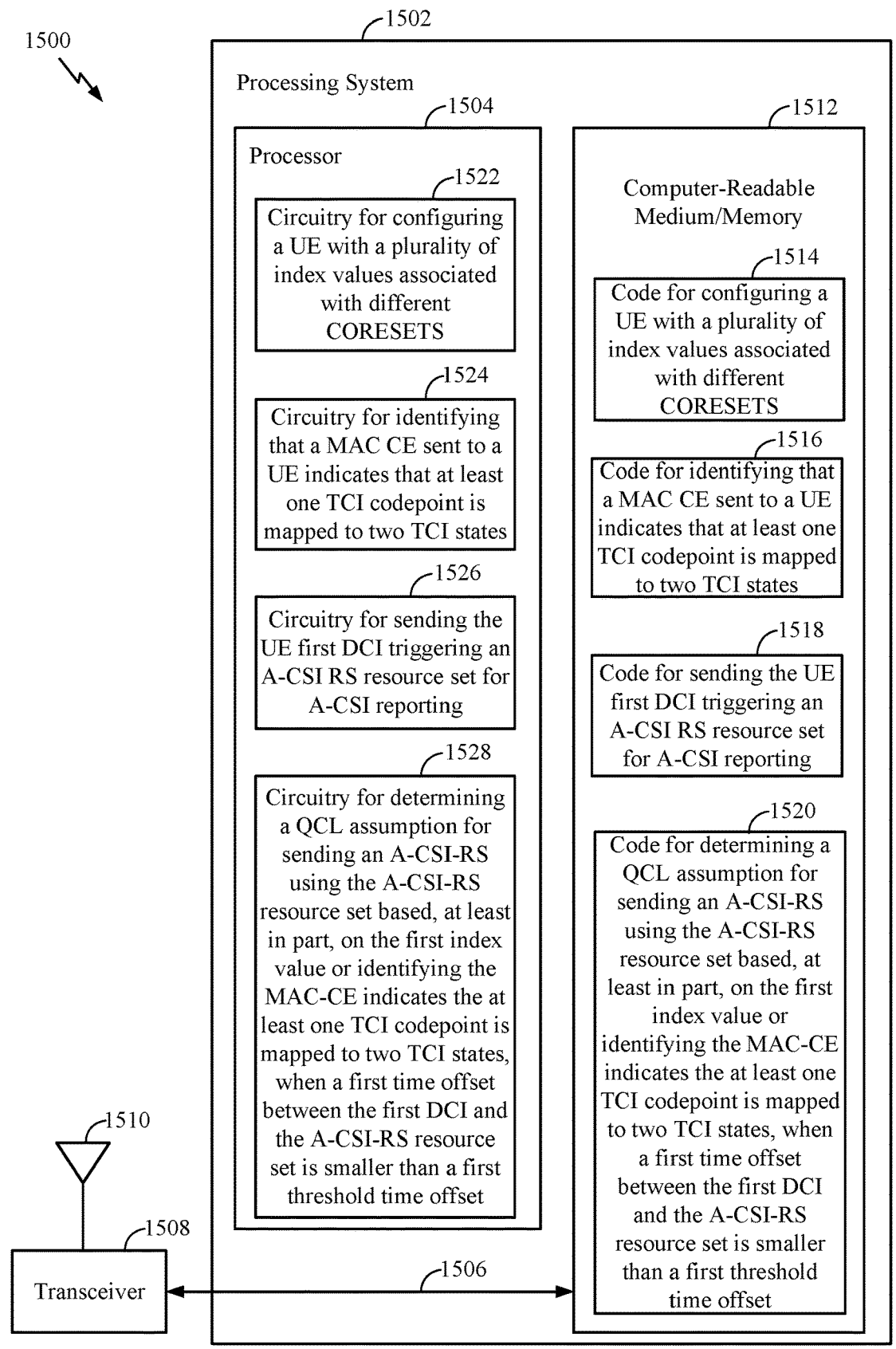
FIG. 15 illustrates a communications device that may include various components configured to perform operations for the techniques disclosed herein, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 10 and/or FIG. 13. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 is configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., a computer-executable code) that when executed by the processor 1504, cause the processor 1504 to perform the operations illustrated in FIG. 10 and/or FIG. 13, or other operations for performing the various techniques discussed herein. In certain aspects, computer-readable medium/memory 1512 stores code 1514 for configuring, code 1516 for identifying, code 1518 for sending, and code 1520 for determining. The code 1514 for configuring may include code for configuring a UE with a plurality of index values associated with different CORESETS. The code 1516 for identifying may include code for identifying that a MAC CE sent to a UE indicates that at least one TCI codepoint is mapped to two TCI states. The code 1518 for sending may include code for sending the UE first DCI triggering an A-CSI RS resource set for A-CSI reporting. The code 1520 for determining may include code for determining a QCL assumption for sending A-CSI-RS using the A-CSI-RS resource set based, at least in part, on the first index value and/or on the identifying the MAC-CE indicates the at least one TCI codepoint is mapped to two TCI states, when a time offset between the first DCI and the A-CSI-RS resource set is smaller than a first threshold time offset.

The processor 1504 may include circuitry configured to implement the code stored in the computer-readable medium/memory 1512, such as for performing the operations illustrated in FIG. 10 and/or FIG. 13, as well as other operations for performing the various techniques discussed herein. For example, the processor 1504 includes circuitry 1522 for configuring, circuitry 1524 for identifying, circuitry 1526 for sending, and circuitry 1528 for determining. The circuitry 1522 for configuring may include circuitry for configuring a UE with a plurality of index values associated with different CORESETS. The circuitry 1524 for identifying may include circuitry for identifying that a MAC CE sent to a UE indicates that at least one TCI codepoint is mapped to two TCI states. The circuitry 1526 for sending may include circuitry for sending the UE first DCI triggering an A-CSI RS resource set for A-CSI reporting. The circuitry 1528 for determining may include circuitry for determining a QCL assumption for sending A-CSI-RS using the A-CSI-RS resource set based, at least in part, on the first index value and/or on the identifying the MAC-CE indicates the at least one TCI codepoint is mapped to two TCI states, when a time offset between the first DCI and the A-CSI-RS resource set is smaller than a first threshold time offset.

Example Aspects

Implementation examples are described in the following numbered aspects.

In a first aspect, a method for wireless communication by a user equipment (UE), comprising: receiving signaling configuring the UE with a plurality of index values associated with different control resource sets (CORESETS); receiving, from a base station (BS), first downlink control information (DCI) triggering an aperiodic channel state information (A-CSI) reference signal (RS) resource set for A-CSI reporting, wherein the first DCI is received in a first CORESET of the different CORESETs, and wherein the first CORESET is associated with a first index value of the plurality of index values; and when a time offset between the first DCI and the A-CSI-RS resource set is smaller than a first threshold time offset, determining a quasi-colocation (QCL) assumption for receiving A-CSI-RS using the A-CSI-RS resource set based, at least in part, on the first index value.

In a second aspect, alone or in combination with the first aspect, the first threshold time offset comprises a beam switching timing parameter reported to the BS as a capability of the UE.

In a third aspect, alone or in combination with one or more of the first and second aspects, the signaling comprises higher layer signaling configuring the UE with a first CORESET pool index value associated with a first plurality of CORESETs and a second CORESET pool index value associated with a second plurality of CORESETs.

In a fourth aspect, alone or in combination with one or more of the first through third aspects, the UE supports concurrent reception of multiple beams and multiple default QCL assumptions for multiple DCI (multi-DCI) multiple transmission reception (mTRP) communication.

In a fifth aspect, alone or in combination with one or more of the first through fourth aspects, determining the QCL assumption for receiving the A-CSI-RS comprises: identifying whether one or more downlink signals are in a same one or more symbols as the A-CSI-RS; and identifying whether the one or more downlink signals are associated with the first index value.

In a sixth aspect, alone or in combination with one or more of the first through fifth aspects, when the UE identifies the one or more downlink signals in the same one or more symbols as the A-CSI-RS and associated with the first index value, determining the QCL assumption for receiving the A-CSI-RS comprises: determining the QCL assumption for receiving the A-CSI-RS as a QCL assumption for one of the one or more downlink signals.

In a seventh aspect, alone or in combination with one or more of the first through sixth aspects, the one or more downlink signals comprise one or more physical downlink shared channels (PDSCHs) scheduled by one or more second DCI received in a CORESET associated with the first index value with a time offset between the one or more second DCI and the one or more PDSCHs is equal to or larger than a second threshold time offset, one or more second A-CSI-RSs scheduled by one or more second DCI received in a CORESET associated with the first index value with a time offset between the one or more second DCI and the one or more A-CSI-RSs is equal to or larger than the first threshold time offset, or one or more physical downlink control channels (PDCCHs) received in a CORESET associated with the first index value.

In an eighth aspect, alone or in combination with one or more of the first through seventh aspects, when the UE identifies the one or more downlink signals in the same one or more symbols as the A-CSI-RS and are not associated with the first index value, determining the QCL assumption for receiving the A-CSI-RS comprises: determining the QCL assumption for receiving the A-CSI-RS as a QCL assumption for one of the one or more downlink signals.

In a ninth aspect, alone or in combination with one or more of the first through eighth aspects, the QCL assumption comprises the QCL assumption or the downlink signal associated with a lowest CSI-RS resource identifier (ID).

In a tenth aspect, alone or in combination with one or more of the first through ninth aspects, when the UE identifies the one or more downlink signals in the same one or more symbols as the A-CSI-RS and are not associated with the first index value, determining the QCL assumption for receiving the A-CSI-RS comprises: determining the QCL assumption for receiving the A-CSI-RS as a default QCL assumption associated with the first index value.

In an eleventh aspect, alone or in combination with one or more of the first through tenth aspects, the default QCL assumption comprises a QCL assumption associated with a lowest CORESET ID of CORESETs associated with the first index value in a latest slot and within an active bandwidth part (BWP) of a serving cell.

In a twelfth aspect, alone or in combination with one or more of the first through eleventh aspects, the one or more downlink signals are associated with a same QCL assumption.

In a thirteenth aspect, alone or in combination with one or more of the first through twelfth aspects, when the UE identifies no second downlink signal in the same one or more symbols as the A-CSI-RS associated with the first index value, determining the QCL assumption for receiving the A-CSI-RS comprises: determining the QCL assumption for receiving the A-CSI-RS as a default QCL assumption associated with the first index value.

In a fourteenth aspect, alone or in combination with one or more of the first through thirteenth aspects, the default QCL assumption comprises a QCL assumption associated with a lowest CORESET ID of CORESETs associated with the first index value in a latest slot and within an active bandwidth part (BWP) of a serving cell.

In a fifteenth aspect, alone or in combination with one or more of the first through fourteenth aspects, determining to apply the QCL assumption indicated in the first DCI when the time offset is equal or greater than the first threshold time offset.

In a sixteenth aspect, alone or in combination with one or more of the first through fifteenth aspects, receiving a CSI reporting configuration configuring the UE with one or more A-CSI-RS resource sets including the A-CSI-RS resource set, each A-CSI-RS resource set comprising a plurality of A-CSI-RS resources, and each A-CSI-RS resource associated with a transmission configuration indicator (TCI) state.

In a seventeenth aspect, a method for wireless communication by a user equipment (UE), comprising: identifying that a medium access control (MAC) control element (CE)

is received from a base station (BS) indicates that at least one transmission configuration indicator (TCI) codepoint is mapped to two TCI states; receiving, from the BS, first downlink control information (DCI) triggering an aperiodic channel state information (A-CSI) reference signal (RS) resource set for A-CSI reporting; and when a time offset between the first DCI and the A-CSI-RS resource set is smaller than a first threshold time offset, determining a quasi-colocation (QCL) assumption for receiving an A-CSI-RS using the A-CSI-RS resource set based, at least in part, on the identifying the MAC-CE indicates the at least one TCI codepoint is mapped to two TCI states.

In an eighteenth aspect, alone or in combination with the seventeenth aspect, the first threshold time offset comprises a beam switching timing parameter reported to the BS as a capability of the UE.

In a nineteenth aspect, alone or in combination with one or more of the seventeenth and eighteenth aspects, receiving radio resource control (RRC) signaling configuring a plurality of TCI states, wherein: the MAC-CE activates a subset of the plurality of TCI states for receiving a physical downlink shared channel (PDSCH) transmission; the MAC-CE maps a plurality of TCI codepoints to one or more TCI states of the subset of the plurality of TCI states; a second DCI indicates one of the plurality of TCI codepoints; and the UE supports concurrent reception of multiple beams and multiple default QCL assumptions for a single DCI (single-DCI) multiple transmission reception (mTRP) communication.

In a twentieth aspect, alone or in combination with one or more of the seventeenth through nineteenth aspects, determining the QCL assumption for receiving the A-CSI-RS comprises: identifying whether one or more downlink signals are in a same one or more symbols as the A-CSI-RS.

In a twenty-one aspect, alone or in combination with one or more of the seventeenth through twentieth aspects, when the UE identifies a downlink signal in the same one or more symbols as the A-CSI-RS and scheduled by a second DCI with a time offset between the second DCI and the downlink signal, and the second DCI indicates two TCI states, determining the QCL assumption for receiving the A-CSI-RS further comprises: determining a first indicated TCI state of two TCI states as the QCL assumption for receiving the A-CSI-RS.

In a twenty-two aspect, alone or in combination with one or more of the seventeenth through twenty-first aspects, the download signal is a physical downlink shared channel (PDSCH) with the two TCI states indicated by the second DCI.

In a twenty-three aspect, alone or in combination with one or more of the seventeenth through twenty-two aspects, when the UE identifies the one or more downlink signals in the same one or more symbols as the A-CSI-RS and indicates a same TCI state, determining the QCL assumption for receiving the A-CSI-RS further comprises: determining the QCL assumption for receiving the A-CSI-RS as a QCL assumption for the downlink signal.

In a twenty-fourth aspect, alone or in combination with one or more of the seventeenth through twenty-three aspects, wherein when the UE identifies multiple downlink signals in the same one or more symbols as the A-CSI-RS, where the multiple downlink signals are not received with the same TCI state, determining the QCL assumption for receiving the A-CSI-RS further comprises: determining the QCL assumption for receiving the A-CSI-RS as the QCL assumption for a physical downlink shared channel (PDSCH) when the multiple downlink signals includes a PDSCH; determining the QCL assumption for receiving the A-CSI-RS as the QCL assumption for another A-CSI-RS when the multiple downlink signals includes another A-CSI-RS; and determining the QCL assumption for receiving the A-CSI-RS as the QCL assumption for a periodical or semi-persistent CSI-RS when the multiple downlink signals includes a periodic or semi-persistent CSI-RS.

In a twenty-fifth aspect, alone or in combination with one or more of the seventeenth through twenty-fourth aspects, wherein determining the QCL assumption for receiving the A-CSI-RS comprises determining the QCL assumption for receiving the A-CSI-RS as the QCL assumption for a periodic or semi-persistent CSI-RS having a lowest CSI-RS resource identifier (ID) when the multiple downlink signals includes multiple periodic or semi-persistent CSI-RS.

In a twenty-sixth aspect, alone or in combination with one or more of the seventeenth through twenty-fifth aspects, when the UE identifies no other downlink signal in the same one or more symbols as the A-CSI-RS, determining the QCL assumption for receiving the A-CSI-RS further comprises: determining the QCL assumption for receiving the A-CSI-RS as a default QCL assumption.

In a twenty-seventh aspect, alone or in combination with one or more of the seventeenth through twenty-sixth aspects, the default QCL assumption comprises a QCL assumption associated with a first TCI state of a lowest TCI codepoint that indicates multiple TCI states.

In a twenty-eighth aspect, alone or in combination with one or more of the seventeenth through twenty-seventh aspects, determining to apply a QCL assumption indicated in the first DCI when the time offset is equal or greater than the first threshold time offset.

In a twenty-ninth aspect, a method for wireless communication by a base station (BS), comprising: configuring a user equipment (UE) with a plurality of index values associated with different control resource sets (CORESETS); sending, the UE, first downlink control information (DCI) triggering an aperiodic channel state information (A-CSI) reference signal (RS) resource set for A-CSI reporting, wherein the first DCI is sent in a first CORESET of the different CORESETs, and wherein the first DCI is associated with a first index value of the plurality of index values; and when a time offset between the first DCI and the A-CSI-RS resource set is smaller than a first threshold time offset, determining a quasi-colocation (QCL) assumption for sending A-CSI-RS using the A-CSI-RS resource set based, at least in part, on the first index value.

In a thirtieth aspect, a method for wireless communication by a base station (BS), comprising: identifying that a medium access control (MAC) control element (CE) sent to a user equipment (UE) indicates that at least one transmission configuration indicator (TCI) codepoint is mapped to two TCI states; sending, the UE, first downlink control information (DCI) triggering an aperiodic channel state information (A-CSI) reference signal (RS) resource set for A-CSI reporting; and when a time offset between the first DCI and the A-CSI-RS resource set is smaller than a first threshold time offset, determining a quasi-colocation (QCL) assumption for sending an A-CSI-RS using the A-CSI-RS resource set based, at least in part, on the identifying the MAC-CE indicates the at least one TCI codepoint is mapped to two TCI states.

An apparatus comprising means for performing the method of any of the first through twenty-eighth aspects.

An apparatus comprising means for performing the method of any of the twenty-ninth through thirtieth aspects.

An apparatus comprising at least one processor and a memory coupled to the at least one processor, the memory comprising code executable by the at least one processor to cause the apparatus to perform the method of any of the first through twenty-eighth aspects.

An apparatus comprising at least one processor and a memory coupled to the at least one processor, the memory comprising code executable by the at least one processor to cause the apparatus to perform the method of any of the twenty-ninth through thirtieth aspects.

A computer readable medium storing computer executable code thereon for wireless communications that, when executed by at least one processor, cause an apparatus to perform the method of any of the first through twenty-eighth aspects.

A computer readable medium storing computer executable code thereon for wireless communications that, when executed by at least one processor, cause an apparatus to perform the method of any of the twenty-ninth through thirtieth aspects.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9, FIG. 10, FIG. 12, and/or FIG. 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
receiving signaling configuring the UE with a plurality of control resource set (CORESET) pool index values, wherein each CORESET pool index value is associated with a different set of CORESETs;
receiving, first downlink control information (DCI) triggering an aperiodic channel state information (A-CSI) reference signal (RS) resource set for A-CSI reporting, wherein the first DCI is received in a first CORESET of the different sets of CORESETs, and wherein the first CORESET is associated with a first CORESET pool index value of the plurality of CORESET pool index values; and
when a time offset between the first DCI and the A-CSI RS resource set is smaller than a first threshold time offset, applying a quasi-colocation (QCL) assumption for receiving an A-CSI RS using the A-CSI RS resource set based, at least in part, on the first CORESET pool index value,
wherein applying the QCL assumption for receiving the A-CSI RS comprises applying a QCL assumption for another downlink signal for receiving the A-CSI RS when the another downlink signal is in a same one or more symbols as the A-CSI RS and is associated with the first CORESET pool index value, and
wherein the another downlink signal comprises:
a physical downlink shared channel (PDSCH) transmission scheduled by a physical downlink control channel (PDCCH) associated with the first CORESET pool index value, a time offset between the PDCCH and the PDSCH transmission being equal to or larger than a second threshold time offset, or
a second A-CSI RS scheduled by a PDCCH associated with the first CORESET pool index value, a time offset between the PDCCH and the second A-CSI RS being equal to or larger than the first threshold time offset.

2. The method of claim 1, further comprising reporting the first threshold time offset to a network entity as a beam switching timing parameter capability of the UE.

3. The method of claim 1, wherein the signaling comprises higher layer signaling configuring the UE with the first CORESET pool index value associated with a first set of a plurality of CORESETs and a second CORESET pool index value associated with a second set of a plurality of CORESETs.

4. The method of claim 1, wherein the UE supports concurrent reception of multiple beams and multiple default QCL assumptions for multiple DCI (multi-DCI) multiple transmission reception (mTRP) communication.

5. The method of claim 1, wherein applying the QCL assumption for receiving the A-CSI RS based, at least in part, on the first CORESET pool index value comprises:
identifying whether one or more downlink signals are in a same one or more symbols as the A-CSI RS; and
identifying whether the one or more downlink signals are associated with the first CORESET pool index value.

6. The method of claim 5, wherein the one or more downlink signals comprise a periodic CSI-RS or a semi-persistent CSI-RS.

7. The method of claim 5, wherein when the UE identifies that the one or more downlink signals are in the same one or more symbols as the A-CSI RS and are not associated with the first CORESET pool index value, applying the QCL assumption for receiving the A-CSI RS comprises applying a QCL assumption for one of the one or more downlink signals for receiving the A-CSI RS.

8. The method of claim 7, wherein the QCL assumption comprises the QCL assumption for the downlink signal, of the one or more downlink signals, associated with a lowest CSI-RS resource identifier (ID).

9. The method of claim 5, wherein when the UE identifies that the one or more downlink signals are in the same one or more symbols as the A-CSI RS and are not associated with the first CORESET pool index value, applying the QCL assumption for receiving the A-CSI RS comprises applying a default QCL assumption associated with the first CORESET pool index value for receiving the A-CSI RS.

10. The method of claim 9, wherein the default QCL assumption comprises a QCL assumption associated with a lowest CORESET ID of the set of CORESETs associated with the first CORESET pool index value in a latest slot and within an active bandwidth part (BWP) of a serving cell.

11. The method of claim 9, wherein the one or more downlink signals are associated with a same QCL assumption.

12. The method of claim 5, wherein applying the QCL assumption comprises when the UE identifies that there is no other downlink signal in the same one or more symbols as the A-CSI RS associated with the first CORESET pool index value, applying a default QCL assumption associated with the first CORESET pool index value for receiving the A-CSI RS.

13. The method of claim 12, wherein the default QCL assumption comprises a QCL assumption associated with a lowest CORESET ID of the set of CORESETs associated with the first CORESET pool index value in a latest slot and within an active bandwidth part (BWP) of a serving cell.

14. The method of claim 1, further comprising applying the QCL assumption indicated in the first DCI for receiving the A-CSI RS when the time offset is equal or greater than the first threshold time offset.

15. The method of claim 1, further comprising receiving a CSI reporting configuration configuring the UE with one or more A-CSI RS resource sets including the A-CSI RS resource set, each A-CSI RS resource set comprising a plurality of A-CSI RS resources, and each A-CSI RS resource associated with a transmission configuration indicator (TCI) state.

16. A method for wireless communication by a user equipment (UE), comprising:
receiving signaling that indicates that at least one transmission configuration indicator (TCI) codepoint is mapped to two TCI states;
receiving first downlink control information (DCI) triggering an aperiodic channel state information (A-CSI) reference signal (RS) resource set for A-CSI reporting; and
when a time offset between the first DCI and the A-CSI RS resource set is smaller than a first threshold time offset, applying a quasi-colocation (QCL) assumption for receiving an A-CSI RS using the A-CSI RS resource set based, at least in part, on receiving the signaling that indicates the at least one TCI codepoint is mapped to two TCI states,
wherein when a downlink signal is in the same one or more symbols as the A-CSI RS and is scheduled by a second DCI with a time offset between the second DCI and the downlink signal and the second DCI indicates two TCI states, applying the QCL assumption for receiving the A-CSI RS comprises applying a first indicated TCI state of two TCI states as the QCL assumption for receiving the A-CSI RS, and
wherein the downlink signal is a physical downlink shared channel (PDSCH) transmission associated with the two TCI states indicated by the second DCI.

17. The method of claim 16, wherein the first threshold time offset comprises a beam switching timing parameter reported as a capability of the UE.

18. The method of claim 16, further comprising receiving radio resource control (RRC) signaling configuring a plurality of TCI states, wherein:

a medium access control (MAC) control element (MAC-CE) activates a subset of the plurality of TCI states for receiving a physical downlink shared channel (PDSCH) transmission;
the MAC-CE maps a plurality of TCI codepoints to one or more TCI states of the subset of the plurality of TCI states;
a second DCI indicates one of the plurality of TCI codepoints; and
the UE supports concurrent reception of multiple beams and multiple default QCL assumptions for a single DCI (single-DCI) multiple transmission reception (mTRP) communication.

19. The method of claim 16, further comprising identifying whether the one or more downlink signals are in the same one or more symbols as the A-CSI RS.

20. The method of claim 19, wherein when the UE identifies the one or more downlink signals are in the same one or more symbols as the A-CSI RS and indicate a same TCI state, applying the QCL assumption for receiving the A-CSI RS comprises applying a QCL assumption for one of the one or more downlink signals for receiving the A-CSI RS.

21. The method of claim 19, wherein the one or more downlink signals comprise:
a PDSCH scheduled with an offset from a DCI scheduling the PDSCH to the PDSCH being equal to or larger than a second threshold time offset, or
another A-CSI RS scheduled with an offset from a DCI scheduling the A-CSI RS to the A-CSI RS being larger than or equal to the first threshold time offset.

22. The method of claim 19, wherein the one or more downlink signals comprise a periodic CSI-RS or a semi-persistent CSI-RS.

23. The method of claim 19, wherein when the UE identifies multiple downlink signals are in the same one or more symbols as the A-CSI RS, where the multiple downlink signals are not received with the same TCI state, applying the QCL assumption for receiving the A-CSI RS further comprises:
applying the QCL assumption for a PDSCH transmission for receiving the A-CSI RS when the multiple downlink signals includes the PDSCH;
applying the QCL assumption for another A-CSI RS for receiving the A-CSI RS when the multiple downlink signals includes the A-CSI RS; and
applying the QCL assumption for a periodic CSI-RS or semi-persistent CSI-RS for receiving the A-CSI RS when the multiple downlink signals includes the periodic CSI-RS or semi-persistent CSI-RS.

24. The method of claim 23, wherein applying the QCL assumption for receiving the A-CSI RS comprises applying the QCL assumption for a periodic CSI-RS or semi-persistent CSI-RS having a lowest CSI-RS resource identifier (ID) for receiving the A-CSI RS when the multiple downlink signals includes multiple periodic CSI-RS or semi-persistent CSI-RS.

25. The method of claim 19, wherein when the UE identifies no other downlink signal in the same one or more symbols as the A-CSI RS, applying the QCL assumption for receiving the A-CSI RS further comprises applying a default QCL assumption for receiving the A-CSI RS.

26. The method of claim 25, wherein the default QCL assumption comprises a QCL assumption associated with a first TCI state of a lowest TCI codepoint that indicates multiple TCI states.

27. The method of claim 16, further comprising applying a QCL assumption indicated in the first DCI for receiving the A-CSI RS when the time offset is equal or greater than the first threshold time offset.

28. A method for wireless communication by a base station (BS), comprising:
- configuring a user equipment (UE) with a plurality of control resource set (CORESET) pool index values, wherein each CORESET pool index value is associated with a different set of CORESETs;
- sending, the UE, first downlink control information (DCI) triggering an aperiodic channel state information (A-CSI) reference signal (RS) resource set for A-CSI reporting, wherein the first DCI is sent in a first CORESET of the different sets of CORESETs, and wherein the first DCI is associated with a first CORESET pool index value of the plurality of CORESET pool index values; and
- when a time offset between the first DCI and the A-CSI RS resource set is smaller than a first threshold time offset, applying a quasi-colocation (QCL) assumption for sending an A-CSI RS using the A-CSI RS resource set based, at least in part, on the first CORESET pool index value,
- wherein applying the QCL assumption for sending the A-CSI RS comprises applying a QCL assumption for another downlink signal for sending the A-CSI RS when the another downlink signal is in a same one or more symbols as the A-CSI RS and is associated with the first CORESET pool index value, and
- wherein the another downlink signal comprises:
  - a physical downlink shared channel (PDSCH) transmission scheduled by a physical downlink control channel (PDCCH) associated with the first CORESET pool index value, a time offset between the PDCCH and the PDSCH transmission being equal to or larger than a second threshold time offset, or
  - a second A-CSI RS scheduled by a PDCCH associated with the first CORESET pool index value, a time offset between the PDCCH and the second A-CSI RS being equal to or larger than the first threshold time offset.

29. The method of claim 28, further comprising receiving reporting from the UE of the first threshold time offset as a beam switching timing parameter capability of the UE.

30. The method of claim 28, wherein the signaling comprises higher layer signaling configuring the UE with the first CORESET pool index value associated with a first set of a plurality of CORESETs and a second CORESET pool index value associated with a second set of a plurality of CORESETs.

31. The method of claim 28, wherein applying the QCL assumption for sending the A-CSI RS based, at least in part, on the first CORESET pool index value comprises:
- identifying whether one or more downlink signals are in a same one or more symbols as the A-CSI RS; and
- identifying whether the one or more downlink signals are associated with the first CORESET pool index value.

32. A method for wireless communication by a base station (BS), comprising:
- sending signaling to a user equipment (UE) that indicates that at least one transmission configuration indicator (TCI) codepoint is mapped to two TCI states;
- sending, the UE, first downlink control information (DCI) triggering an aperiodic channel state information (A-CSI) reference signal (RS) resource set for A-CSI reporting; and
- when a time offset between the first DCI and the A-CSI RS resource set is smaller than a first threshold time offset, applying a quasi-colocation (QCL) assumption for sending an A-CSI RS using the A-CSI RS resource set based, at least in part, on the signaling that indicates the at least one TCI codepoint is mapped to two TCI states,
- wherein when a downlink signal is in the same one or more symbols as the A-CSI RS and is scheduled by a second DCI with a time offset between the second DCI and the downlink signal and the second DCI indicates two TCI states, applying the QCL assumption for sending the A-CSI RS comprises applying a first indicated TCI state of two TCI states as the QCL assumption for sending the A-CSI RS, and
- wherein the downlink signal is a physical downlink shared channel (PDSCH) transmission associated with the two TCI states indicated by the second DCI.

33. The method of claim 32, wherein the first threshold time offset comprises a beam switching timing parameter reported as a capability of the UE.

34. The method of claim 32, further comprising sending radio resource control (RRC) signaling configuring a plurality of TCI states, wherein:
- a medium access control (MAC) control element (MAC-CE) activates a subset of the plurality of TCI states for sending a physical downlink shared channel (PDSCH) transmission;
- the MAC-CE maps a plurality of TCI codepoints to one or more TCI states of the subset of the plurality of TCI states;
- a second DCI indicates one of the plurality of TCI codepoints; and
- the UE supports concurrent reception of multiple beams and multiple default QCL assumptions for a single DCI (single-DCI) multiple transmission reception (mTRP) communication.

35. The method of claim 32, wherein applying the QCL assumption for sending the A-CSI RS comprises identifying whether one or more downlink signals are in the same one or more symbols as the A-CSI RS.

36. An apparatus for wireless communication, comprising:
- a memory; and
- at least one processor coupled to the memory, the at least one processor configured to cause the apparatus to:
  - receive signaling configuring the apparatus with a plurality of control resource set (CORESET) pool index values, wherein each CORESET pool index value is associated with a different set of CORESETs;
  - receive, first downlink control information (DCI) triggering an aperiodic channel state information (A-CSI) reference signal (RS) resource set for A-CSI reporting, wherein the first DCI is received in a first CORESET of the different sets of CORESETs, and wherein the first CORESET is associated with a first CORESET pool index value of the plurality of CORESET pool index values; and
  - when a time offset between the first DCI and the A-CSI RS resource set is smaller than a first threshold time offset, apply a quasi-colocation (QCL) assumption for receiving an A-CSI RS using the A-CSI RS resource set based, at least in part, on the first CORESET pool index value,
  - wherein the least one processor being configured to cause the apparatus to apply the QCL assumption for receiving the A-CSI RS comprises the least one processor being configured to cause the apparatus to apply a QCL assumption for another downlink signal for receiving the A-CSI RS when the another downlink signal is in a same one or more symbols as the A-CSI RS and is associated with the first CORESET pool index value, and wherein the another downlink signal comprises:
- a physical downlink shared channel (PDSCH) transmission scheduled by a physical downlink control channel (PDCCH) associated with the first CORESET pool index value, a time offset between the PDCCH and the PDSCH transmission being equal to or larger than a second threshold time offset, or
- a second A-CSI RS scheduled by a PDCCH associated with the first CORESET pool index value, a time offset between the PDCCH and the second A-CSI RS being equal to or larger than the first threshold time offset.

37. The apparatus of claim 36, wherein the at least one processor is configured to cause the apparatus to report the first threshold time offset to a network entity as a beam switching timing parameter capability of the apparatus.

38. The apparatus of claim 36, wherein the signaling comprises higher layer signaling configuring the apparatus with the first CORESET pool index value associated with a first set of a plurality of CORESETs and a second CORESET pool index value associated with a second set of a plurality of CORESETs.

39. The apparatus of claim 36, wherein the at least one processor being configured to cause the apparatus to apply the QCL assumption for receiving the A-CSI RS based, at least in part, on the first CORESET pool index value comprises the at least one processor being configured to cause the apparatus to:
identify whether one or more downlink signals are in a same one or more symbols as the A-CSI RS; and
identify whether the one or more downlink signals are associated with the first CORESET pool index value.

40. The apparatus of claim 39, wherein the one or more downlinks signal comprises periodic CSI-RS or semi-persistent CSI-RS.

41. The apparatus of claim 39, wherein the at least one processor configured to cause the apparatus to apply the QCL assumption for receiving the A-CSI RS comprises the at least one processor configured to cause the apparatus to:
apply a default QCL assumption associated with the first CORESET pool index value for receiving the A-CSI RS when the apparatus identifies that there is no second downlink signal in the same one or more symbols as the A-CSI RS associated with the first CORESET pool index value.

42. The apparatus of claim 41, wherein the default QCL assumption comprises a QCL assumption associated with a lowest CORESET ID of the set of CORESETs associated with the first CORESET pool index value in a latest slot and within an active bandwidth part (BWP) of a serving cell.

43. An apparatus for wireless communication, comprising:
a memory; and
at least one processor coupled to the memory, the at least one processor configured to cause the apparatus to:
receive signaling that indicates that at least one transmission configuration indicator (TCI) codepoint is mapped to two TCI states;
receive first downlink control information (DCI) triggering an aperiodic channel state information (A-CSI) reference signal (RS) resource set for A-CSI reporting; and
when a time offset between the first DCI and the A-CSI RS resource set is smaller than a first threshold time offset, apply a quasi-colocation (QCL) assumption for receiving an A-CSI RS using the A-CSI RS resource set based, at least in part, on receiving the signaling that indicates the at least one TCI codepoint is mapped to two TCI states,
wherein when a downlink signal is in the same one or more symbols as the A-CSI RS and is scheduled by a second DCI with a time offset between the second DCI and the downlink signal and the second DCI indicates two TCI states, the at least one processor being configured to cause the apparatus to apply the QCL assumption for receiving the A-CSI RS comprises the at least one processor being configured to cause the apparatus to apply a first indicated TCI state of two TCI states as the QCL assumption for receiving the A-CSI RS, and
wherein the downlink signal is a physical downlink shared channel (PDSCH) transmission associated with the two TCI states indicated by the second DCI.

44. The apparatus of claim 43, wherein the first threshold time offset comprises a beam switching timing parameter reported as a capability of the apparatus.

45. The apparatus of claim 43, wherein the at least one processor is configured to cause the apparatus to receive radio resource control (RRC) signaling configuring a plurality of TCI states, and wherein;
a medium access control (MAC) control element (MAC-CE) activates a subset of the plurality of TCI states for receiving a PDSCH transmission;
the MAC-CE maps a plurality of TCI codepoints to one or more TCI states of the subset of the plurality of TCI states;
a second DCI indicates one of the plurality of TCI codepoints; and
the apparatus supports concurrent reception of multiple beams and multiple default QCL assumptions for a single DCI (single-DCI) multiple transmission reception (mTRP) communication.

46. The apparatus of claim 43, wherein the at least one processor being configured to cause the apparatus to apply the QCL assumption for receiving the A-CSI RS comprises the at least one processor being configured to cause the apparatus to identify whether one or more downlink signals are in a same one or more symbols as the A-CSI RS.

47. The apparatus of claim 46, wherein when the apparatus identifies that a downlink signal is in the same one or more symbols as the A-CSI RS and is scheduled by a second DCI with a time offset between the second DCI and the downlink signal and the second DCI indicates two TCI states, the at least one processor being configured to cause the apparatus to apply the QCL assumption for receiving the A-CSI RS comprises the at least one processor being configured to cause the apparatus to apply a first indicated TCI state of two TCI states as the QCL assumption for receiving the A-CSI RS.

48. The apparatus of claim 46, wherein when the apparatus identifies that the one or more downlink signals are in the same one or more symbols as the A-CSI RS and indicate a same TCI state, the at least one processor being configured to cause the apparatus to apply the QCL assumption for receiving the A-CSI RS comprises the at least one processor being configured to cause the apparatus to apply a QCL assumption for one of the one or more downlink signals for receiving the A-CSI RS.

49. The apparatus of claim 46, wherein the one or more downlink signals comprise:
   a PDSCH scheduled with an offset from a DCI scheduling the PDSCH to the PDSCH being equal to or larger than a second threshold time offset, or
   another A-CSI RS scheduled with an offset from a DCI scheduling the A-CSI RS to the A-CSI RS being larger than or equal to the first threshold time offset.

50. The apparatus of claim 46, wherein the one or more downlink signals comprise a periodic CSI-RS or a semi-persistent CSI-RS.

51. The apparatus of claim 46, wherein when the apparatus identifies that there is no other downlink signal in the same one or more symbols as the A-CSI RS, the at least one processor being configured to cause the apparatus to apply the QCL assumption for receiving the A-CSI RS comprises the at least one processor being configured to cause the apparatus to apply a default QCL assumption for receiving the A-CSI RS.

52. The apparatus of claim 51, wherein the default QCL assumption comprises a QCL assumption associated with a first TCI state of a lowest TCI codepoint that indicates multiple TCI states.

* * * * *